United States Patent
Jones et al.

(10) Patent No.: US 10,893,181 B2
(45) Date of Patent: Jan. 12, 2021

(54) SYSTEM AND APPARATUS FOR COLOR IMAGING DEVICE

(71) Applicant: Chromatra, LLC, Beverly, MA (US)

(72) Inventors: Peter W. J. Jones, Belmont, MA (US); Paul Stump, Magnolia, MA (US); Robert Pitman, Beverly, MA (US); Ellen Cargill, Norfolk, MA (US); Dennis Purcell, Medford, MA (US)

(73) Assignee: Chromatra, LLC, Beverly, MA (US)

( * ) Notice: Subject to any disclaimer, the term of this patent is extended or adjusted under 35 U.S.C. 154(b) by 0 days.

(21) Appl. No.: 16/750,775

(22) Filed: Jan. 23, 2020

(65) Prior Publication Data

US 2020/0169653 A1 May 28, 2020

Related U.S. Application Data

(63) Continuation of application No. PCT/US2018/043553, filed on Jul. 24, 2018.

(60) Provisional application No. 62/536,349, filed on Jul. 24, 2017.

(51) Int. Cl.
*H04N 5/225* (2006.01)
*H04N 5/232* (2006.01)
*G03B 7/18* (2006.01)

(52) U.S. Cl.
CPC ............ *H04N 5/2254* (2013.01); *G03B 7/18* (2013.01); *H04N 5/23212* (2013.01)

(58) Field of Classification Search
None
See application file for complete search history.

(56) References Cited

U.S. PATENT DOCUMENTS

| 2,971,093 A | 2/1961 | Garbuny |
| 3,736,050 A | 5/1973 | Bolum |
| 3,971,065 A | 7/1976 | Bayer |
| 4,085,421 A | 4/1978 | Gilmour |

(Continued)

FOREIGN PATENT DOCUMENTS

| CN | 106375742 A | 2/2017 |
| WO | 03/079057 A2 | 9/2003 |

OTHER PUBLICATIONS

Office Action dated Jul. 16, 2020 in connection with U.S. Appl. No. 16/453,900, 9 pages.

(Continued)

*Primary Examiner* — William B Perkey

(57) ABSTRACT

An integrated color imaging system has a housing with an objective lens, photocathode and image intensifier. The image intensifier has radiation sensitive sensors and a phosphor screen. A rotatable first filter wheel is located between the objective lens and the photocathode. The first filter wheel can include first channels selectively positionable in an optical path of the image, and at least one of the first channels is clear and unfiltered. A rotatable second filter wheel can be located inside the housing between the phosphor screen and an eyepiece lens of the housing. The second filter wheel can include second channels selectively positionable in the optical path between the phosphor screen and the eyepiece lens, and at least one of the second channels is clear and unfiltered. The clear and unfiltered channels of the first and second filter wheels can be selectively aligned and held in the optical path.

10 Claims, 21 Drawing Sheets

(56) References Cited

U.S. PATENT DOCUMENTS

| | | | |
|---|---|---|---|
| 4,679,068 A | | 7/1987 | Lillquist et al. |
| 4,800,474 A | * | 1/1989 | Bornhorst ............. F21S 10/007 |
| | | | 362/293 |
| 5,051,821 A | | 9/1991 | Vittot et al. |
| 5,214,503 A | | 5/1993 | Chiu et al. |
| H001599 H | | 10/1996 | Task et al. |
| 5,812,187 A | | 9/1998 | Watanabe |
| 5,986,767 A | * | 11/1999 | Nakano ................... G01J 3/524 |
| | | | 356/416 |
| 6,327,093 B1 | | 12/2001 | Nakanishi et al. |
| 6,614,606 B2 | | 9/2003 | Jones |
| 7,345,277 B2 | | 3/2008 | Zhang |
| 7,507,964 B2 | | 3/2009 | Jones et al. |
| 7,929,727 B2 | | 4/2011 | Jones et al. |
| 8,130,292 B2 | | 3/2012 | Lee |
| 8,259,201 B2 | | 9/2012 | Stuck et al. |
| 8,295,631 B2 | | 10/2012 | Adams, Jr. et al. |
| 8,988,590 B2 | | 3/2015 | Gillet et al. |
| 9,177,988 B2 | | 11/2015 | Jones et al. |
| 9,955,127 B2 | | 4/2018 | Jones et al. |
| 2001/0019363 A1 | | 9/2001 | Katta et al. |
| 2001/0045988 A1 | | 11/2001 | Yamauchi et al. |
| 2002/0067560 A1 | | 6/2002 | Jones |
| 2003/0218676 A1 | | 11/2003 | Miyahara |
| 2004/0086186 A1 | | 5/2004 | Kyusojin et al. |
| 2004/0212677 A1 | | 10/2004 | Uebbing |
| 2004/0247173 A1 | | 12/2004 | Nielsen et al. |
| 2005/0200701 A1 | * | 9/2005 | Jones ....................... H04N 5/30 |
| | | | 348/168 |
| 2005/0207015 A1 | | 9/2005 | Jones et al. |
| 2006/0017829 A1 | | 1/2006 | Gallagher |
| 2006/0088298 A1 | | 4/2006 | Frame et al. |
| 2006/0125921 A1 | | 6/2006 | Foote |
| 2006/0187326 A1 | | 8/2006 | Spencer |
| 2007/0081084 A1 | | 4/2007 | Wernersson |
| 2008/0237771 A1 | | 10/2008 | Pilla et al. |
| 2009/0296247 A1 | | 12/2009 | Jones et al. |
| 2010/0245636 A1 | | 9/2010 | Kumar et al. |
| 2012/0147243 A1 | | 6/2012 | Townsend et al. |
| 2012/0200734 A1 | | 8/2012 | Tang |
| 2016/0330358 A1 | | 11/2016 | Fergus et al. |

OTHER PUBLICATIONS

Notification of Transmittal of the International Search Report and the Written Opinion of the International Searching Authority, or the Declaration dated Feb. 26, 2013 in connection with International Patent Application No. PCT/US12/707170, 12 pages.

Google search for NPL log, Nov. 23, 2017, 1 page.

Notification of Transmittal of the International Search Report and the Written Opinion of the International Searching Authority, or the Declaration dated Oct. 22, 2018 in connection with International Patent Application No. PCT/US2018/043553, 12 pages.

* cited by examiner

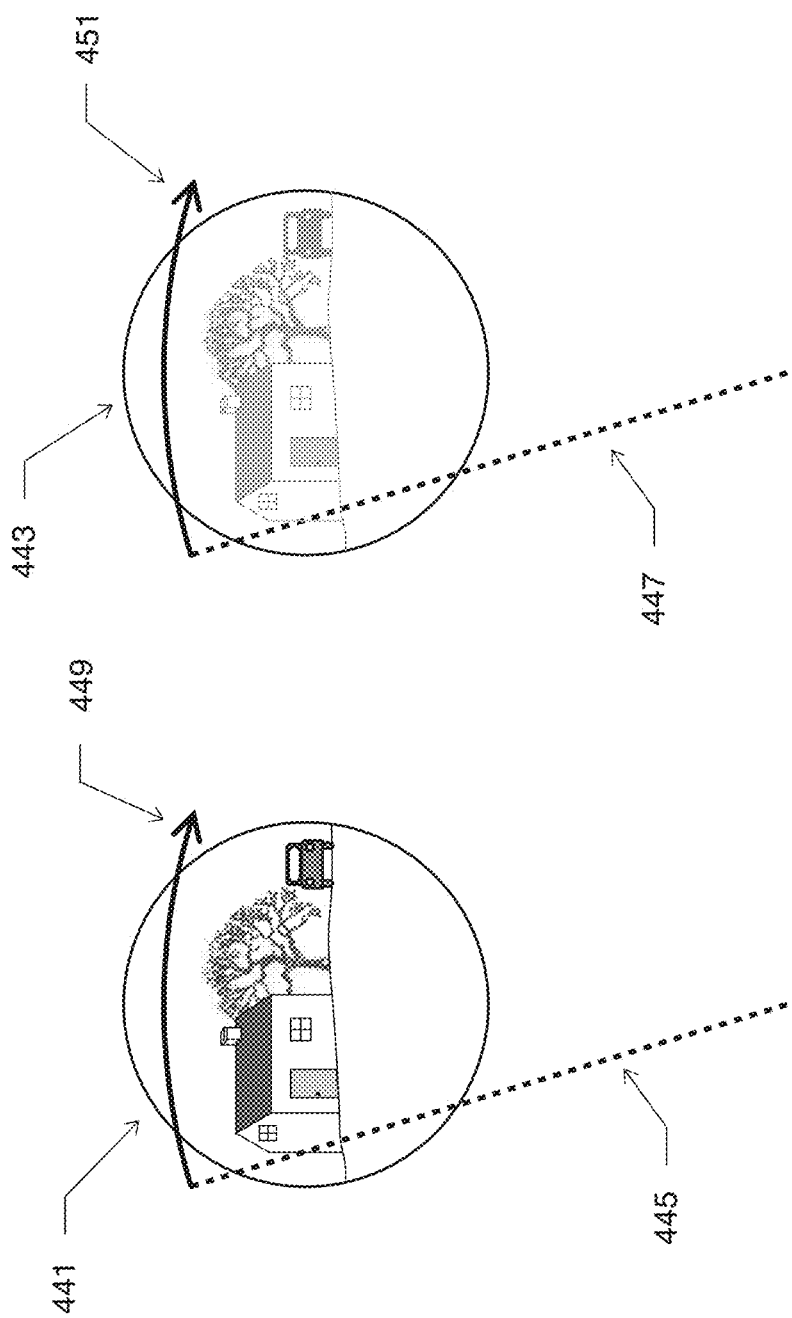

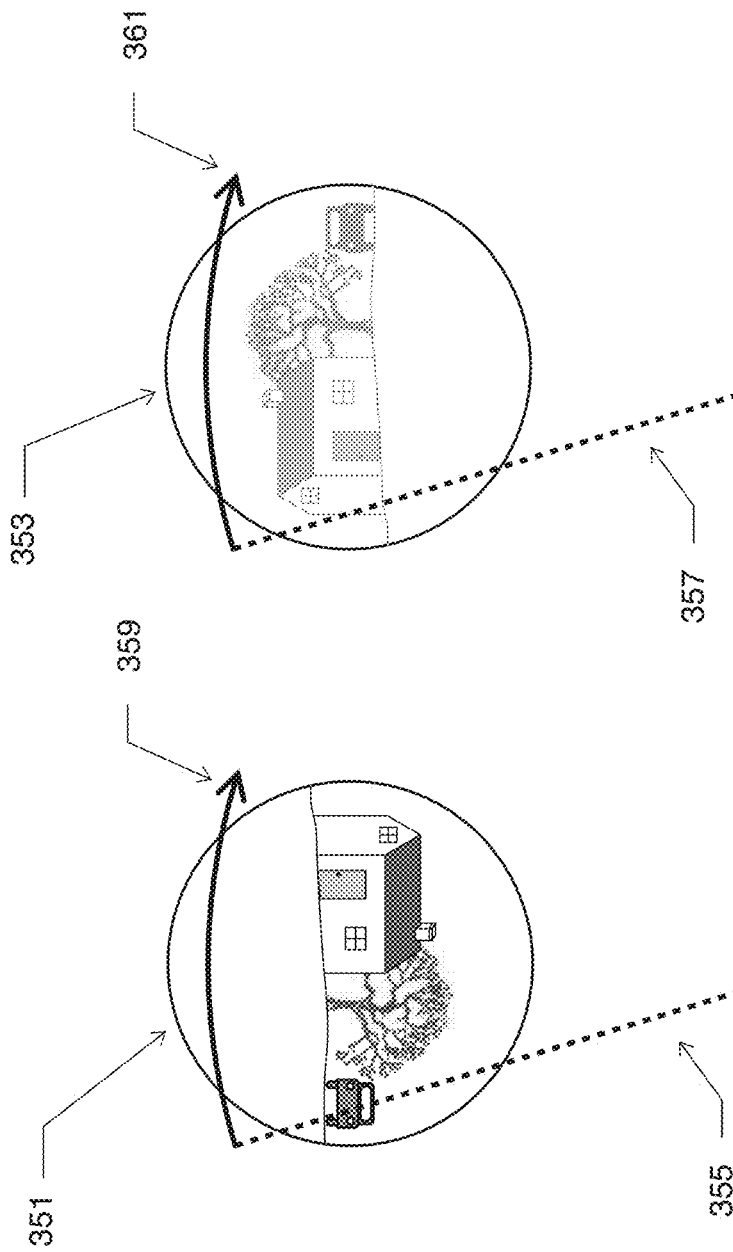

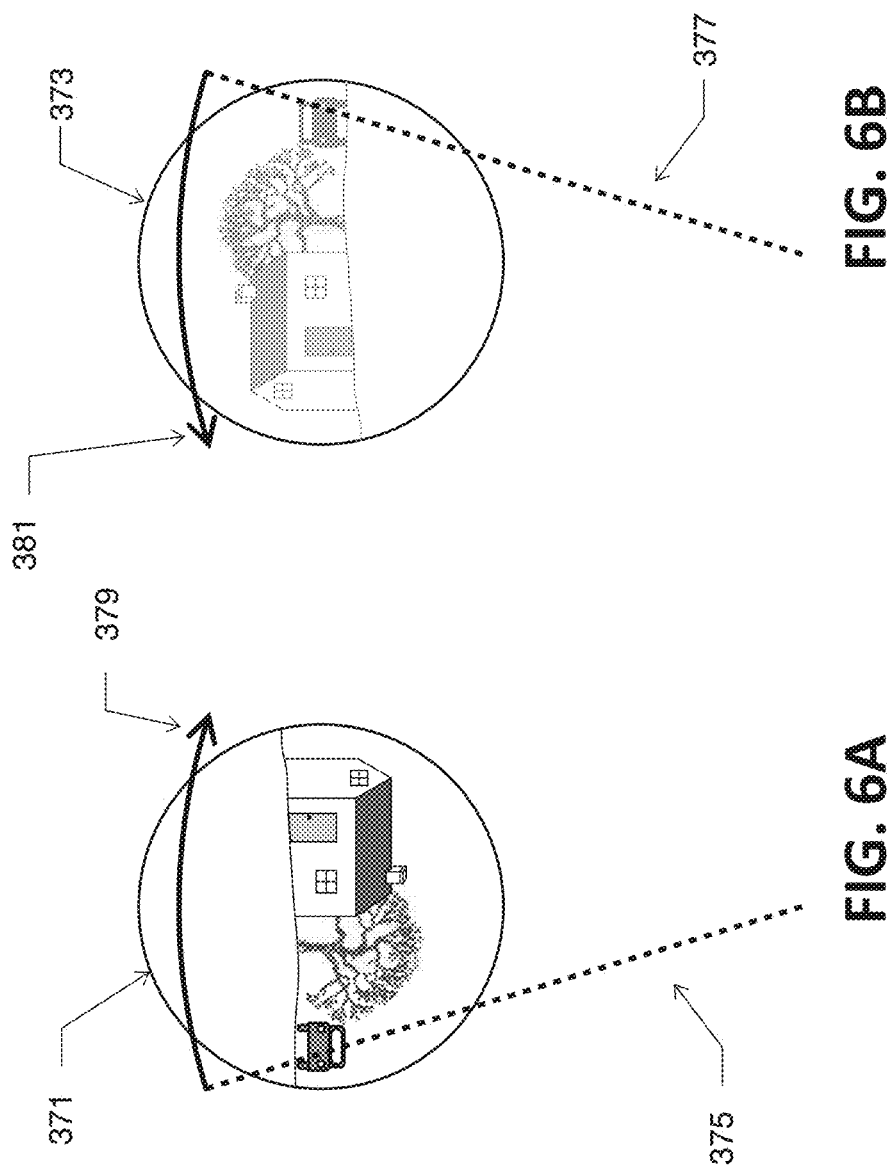

SYSTEM AND APPARATUS FOR COLOR IMAGING DEVICE

CROSS-REFERENCE TO OTHER APPLICATIONS

This application is a continuation of International Patent Application No. PCT/US2018/043553, filed Jul. 24, 2018, which claims the benefit of the filing date of U.S. Provisional Patent Application 62/536,349, filed Jul. 24, 2017, both of which are hereby incorporated by reference in their entireties.

TECHNICAL FIELD

The present invention relates in general to optical viewing devices and, in particular, to a system, method and apparatus for a color imaging device.

BACKGROUND OF THE DISCLOSURE

Conventional optical devices, such as a night vision device (NVD), can incorporate and/or be used with an externally-mounted filter system for enhancing the view provided by the device. For example, a "clip-on" filter system can be attached to the exterior of the NVD. Such filter systems can include two filter wheels that are mounted on a shaft and rotated outside of the NVD. Externally-mounted filter systems can be bulky and have sealing issues with regard to the external environment. In addition, conventional color cameras also are known and can be useful in low light conditions. Such color cameras typically use a sensor with very large pixels that greatly increases the cost of the camera. Thus, improvements in optical viewing devices continue to be of interest.

SUMMARY OF THE DISCLOSURE

Embodiments of a system, method and apparatus for a color imaging device are disclosed. For example, an integrated color imaging system can include a housing having an objective lens to receive an image of incident electromagnetic radiation from a scene and focus the image on a photocathode of an image intensifier located inside the housing. The image intensifier can include radiation sensitive sensors and a phosphor screen. A first filter wheel can be located inside the housing between the objective lens and the photocathode. The first filter wheel is rotatable relative to the image intensifier. The first filter wheel can include first channels selectively positionable in an optical path of the image, and at least one of the first channels is clear and unfiltered. A second filter wheel can be located inside the housing between the phosphor screen and an eyepiece lens of the housing. The second filter wheel is rotatable relative to the image intensifier. The second filter wheel can include second channels selectively positionable in the optical path between the phosphor screen and the eyepiece lens, and at least one of the second channels is clear and unfiltered. The clear and unfiltered channels of the first and second filter wheels can be selectively aligned in the optical path and retained in stationary positions.

The foregoing and other objects and advantages of these embodiments will be apparent to those of ordinary skill in the art in view of the following detailed description, taken in conjunction with the appended claims and the accompanying drawings.

BRIEF DESCRIPTION OF THE DRAWINGS

So that the manner in which the features and advantages of the embodiments are attained and can be understood in more detail, a more particular description can be had by reference to the embodiments thereof that are illustrated in the appended drawings. However, the drawings illustrate only some embodiments and therefore are not to be considered limiting in scope as there can be other equally effective embodiments.

FIG. 4A is a schematic illustration of an image at the front of an embodiment of the optical device of FIG. 1.

FIG. 4B is a schematic illustration of an image at the rear of an embodiment of the optical device of FIG. 1.

FIG. 5A is a schematic illustration of an image at the front of an embodiment of the optical device of FIG. 1.

FIG. 5B is a schematic illustration of an image at the rear of an embodiment of the optical device of FIG. 1.

FIG. 6A is a schematic illustration of an image at the front of an embodiment of the optical device of FIG. 2.

FIG. 6B is a schematic illustration of an image at the rear of an embodiment of the optical device of FIG. 1.

The use of the same reference symbols in different drawings indicates similar or identical items.

DETAILED DESCRIPTION

Embodiments of a system, method and apparatus for night vision devices (NVD) are disclosed. This patent application refers to U.S. Pat. No. 6,614,606, issued on Sep. 2, 2003, and U.S. Pat. No. 9,177,988, issued on Nov. 3, 2015, each of which is incorporated herein by reference in its entirety.

1. Optical Device with Filters

Figure 1:
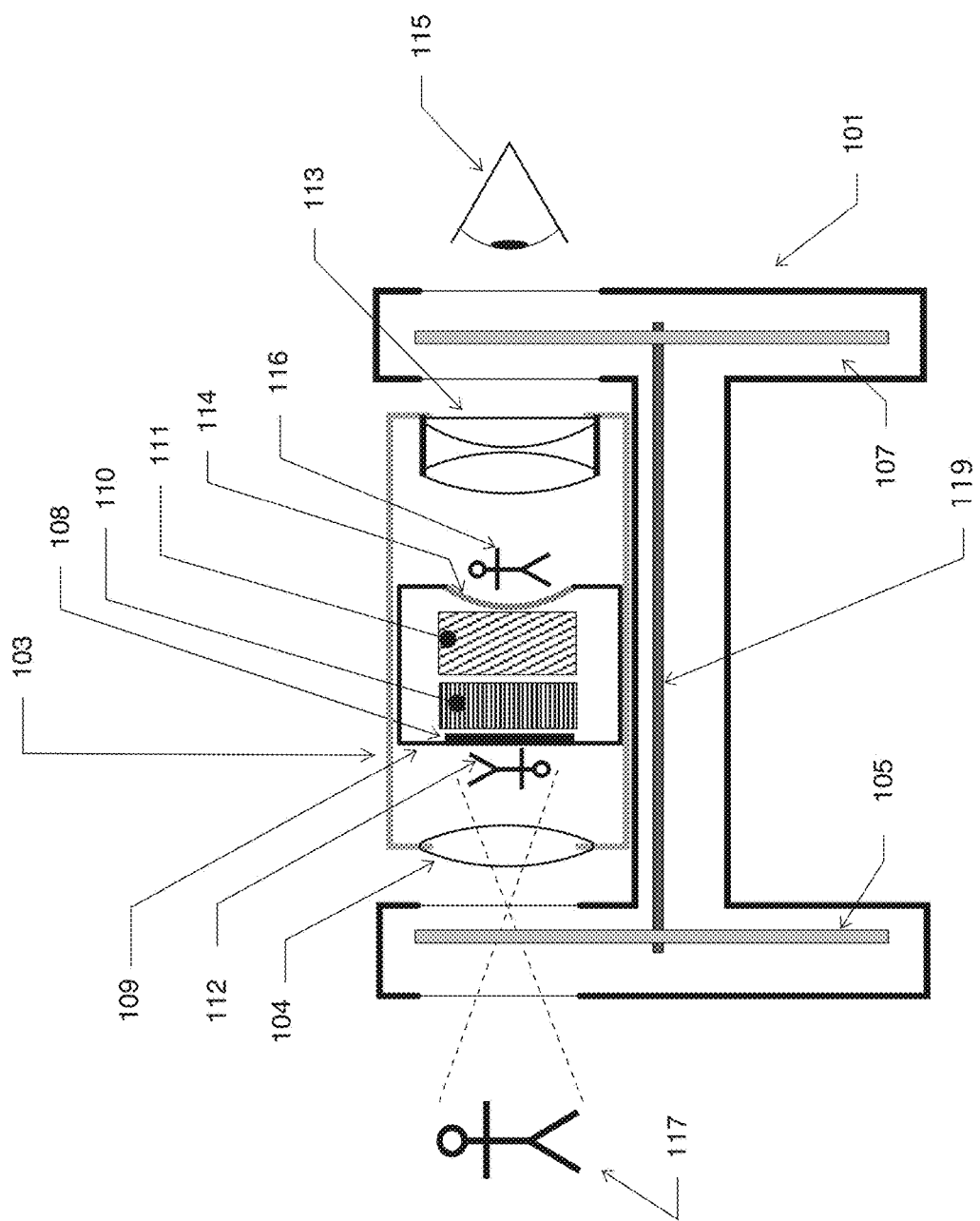
FIG. 1 is a schematic, sectional side view diagram of an embodiment of an optical device.

In one embodiment, a color adaptor device 101 (FIG. 1) can be attached to a night vision device (NVD) 103. Versions of the NVD 103 can have an objective lens 104, an image intensifier 109 which includes a photocathode 108, a microchannel plate 110, a fiber optic bundle 111 and a phosphor screen 114, as shown. As shown in FIG. 1, an image 112 of the scene or subject 117 is rotated 180 degrees when it strikes the photocathode 108. After passing through the microchannel plate 110 and the inverting fiber optic bundle 111, an "erect" image 116 can be presented at the phosphor screen 114, which is seen through the eyepiece lens 113 of the night vision device 103 by the observer 115. The use of the inverting fiber optic bundle 111 can simplify the eyepiece lens 113 required in the night vision device 103. In the version shown, image 112 contains color information from the scene 117, but image 116 on the phosphor screen 114 is monochromatic. When the NVD 103 is enclosed by the color adaptor device 101, the images of the scene or subject 117 are seen through filter wheels 105 and 107 as they rotate about an axis 119, such as that of an axle or shaft.

In other embodiments, the color adapter device 101 of FIG. 1 can include any of the elements or limitations of other embodiments described herein. For example, the color adapter device 101 can include one or more clear channels in filter wheels 105, 107, and/or a "leaky" short wave pass filter.

Figure 2:
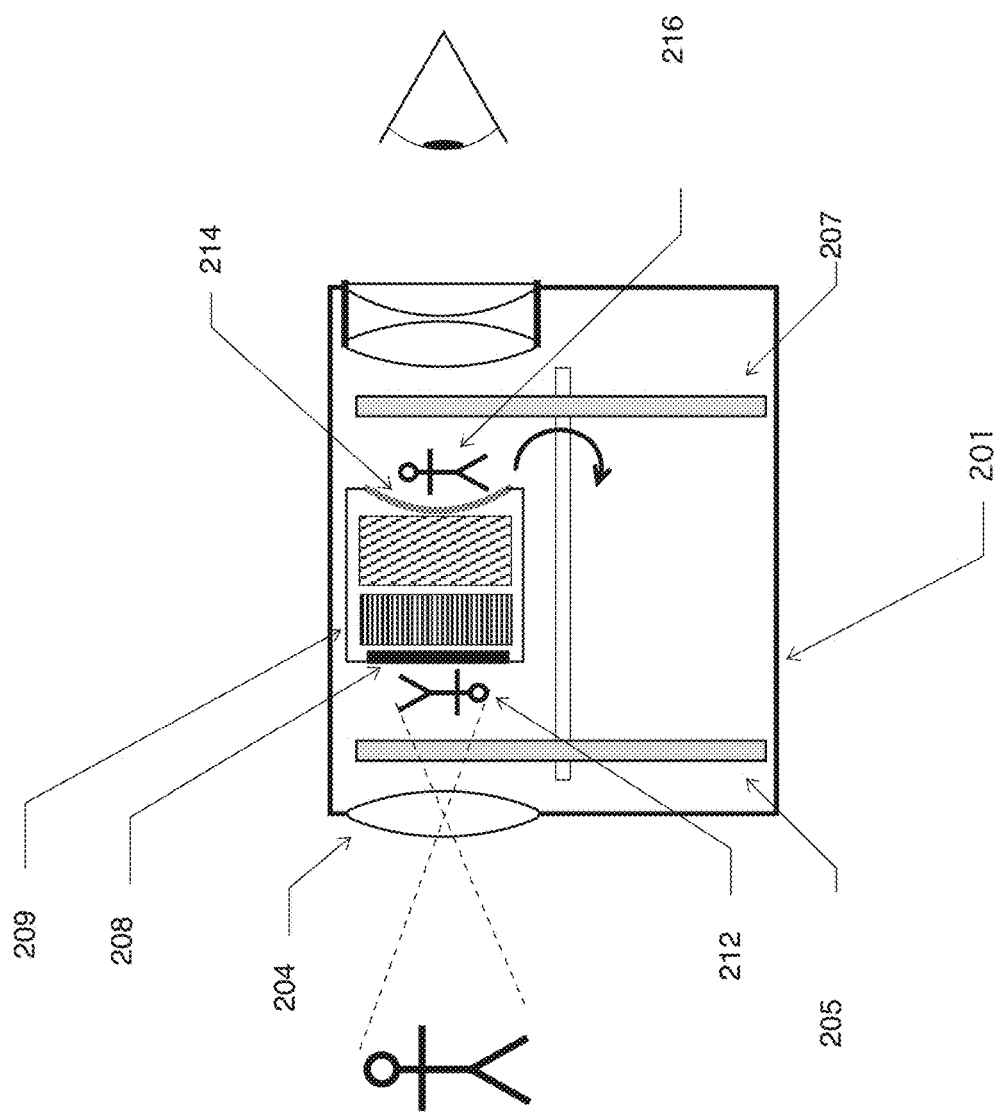
FIG. 2 is a schematic, sectional side view diagram of an embodiment of an integrated optical device.
Figure 3B:
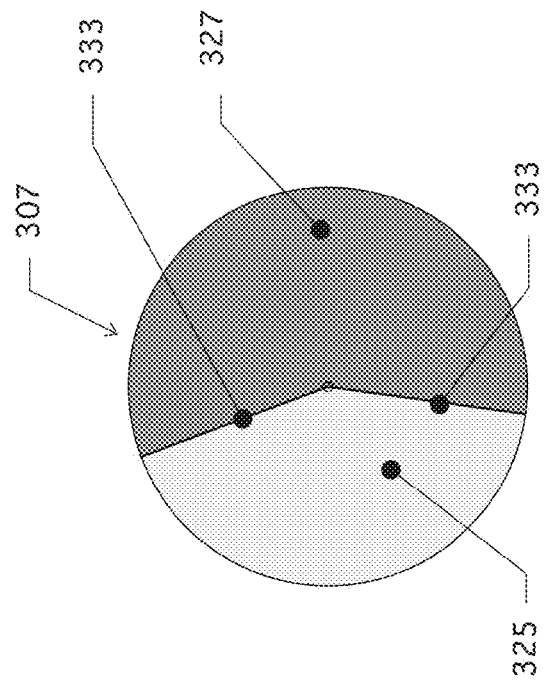
FIG. 3B is a schematic illustration of an embodiment of a filter used in an optical device.
Figure 3D:
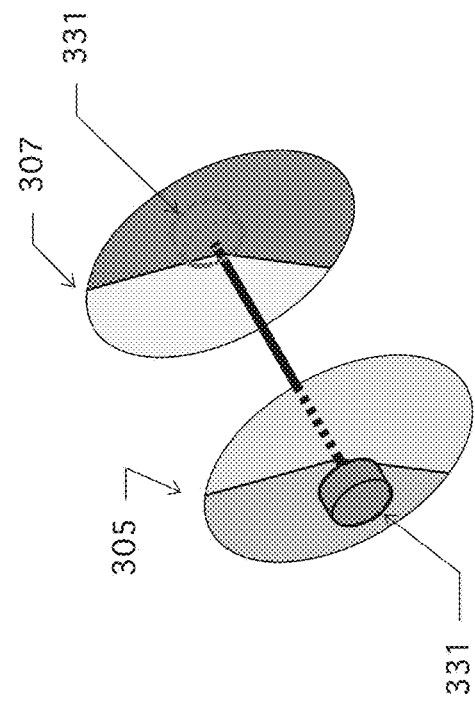
FIG. 3D is a schematic illustration of an embodiments of a filter used in an optical device.
Figure 3A:
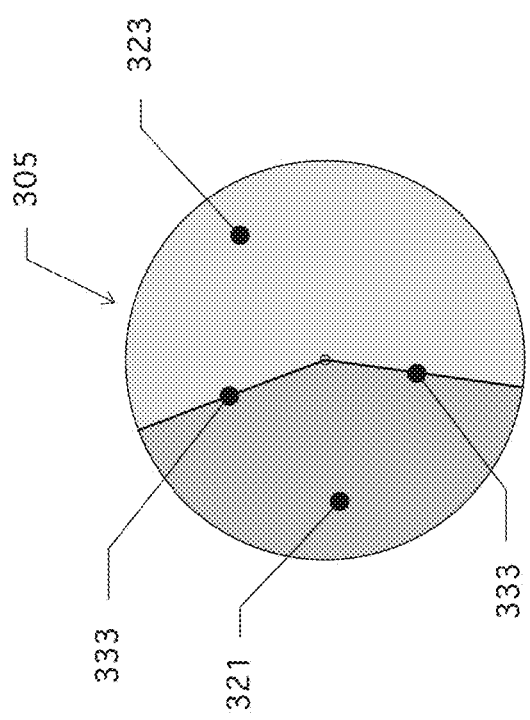
FIG. 3A is a schematic illustration of an embodiment of a filter used in an optical device.
Figure 3C:
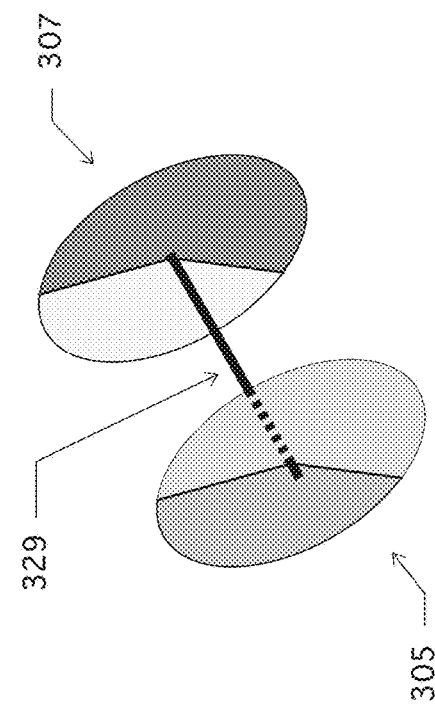
FIG. 3C is a schematic illustration of an embodiments of a filter used in an optical device.

FIG. 2 depicts an embodiment of an integrated color NVD 201 having a housing containing filter wheels 205, 207 that are mounted internally, directly in front and back of the image intensifier 209. The integrated color NVD 201 can be configured with many of the same components as the NVD 103, or different components. Mounting the filter wheels 205, 207 inside the integrated color NVD 201 provides a more compact, better-sealed color night vision assembly. In addition to using this design with a monocular or binocular night vision device, such a unit with internally mounted filter wheels 205, 207 also is suitable for different applications, such as in-line rifle sights and other devices where it is desirable to mount the filters internally rather than externally. With the internally mounted filter wheels 205, 207, the filter wheel 205 that is forward can be mounted adjacent to the photocathode 208, which is adjacent the image 212 that is inverted and focused by the objective lens 204. In addition, the filter wheel 207 in the rear can be adjacent to the image 216 that is "erect" on the phosphor screen 214. The fiber optic bundle 211 in the image intensifier 209 can have the effect of changing the inverting image 212 to become an erect image 216 at the phosphor screen 214.

FIGS. 3A-3D are other schematic views of embodiments of filter wheels for the color adaptor device 101 and integrated color NVD 201. Each filter wheel 305, 307 can have at least two separate optical channels, 321, 323, and 325, 327, respectively. Each channel 321, 323, 325, 327 can have a selected transmission characteristic. Each filter channel on a particular wheel can differ from the other channel(s) on that same wheel. In addition, the filtration characteristics of each wheel can differ from the filter characteristics of the other wheel. The two filter wheels 305, 307 can be synchronized by mounting them to a common shaft 329, and they can be driven on separate shafts by separate, synchronized motors 331. As the filter wheels 305, 307 rotate, the transitions 333 between their respective filter channels sweep across the front and rear of the NVD in the case of a clip-on color adaptor device (FIG. 1), or across the front and rear of the image intensifier 209 in the case of an integrated color NVD (FIG. 2). Note that if the color information from the differently filtered channels becomes mixed, the quality of color perception for the user can be degraded.

Still other embodiments can include using two or more pairs of optical channels or filter segments for a filter wheel. For example, when a filter wheel includes two pairs of short wave pass (SWP)/clear sections, the apparent rotational speed of the filter (i.e., how quickly there is alternation of the channel segments) can double, which can reduce the flicker effect when viewing a subject through the device. In addition, reduced blackout areas can be used when the filter wheels are mounted adjacent to the image intensifier. Another alternative is to increase the filter rotation speed, which can raise power consumption and increase gyroscopic effects.

In the clip-on color adaptor device of FIGS. 1 and 4A-4B, an image of the view of the scene 441 (FIG. 4A) is shown as seen from the NVD, and the image of the scene 443 (FIG. 4B) as presented on the phosphor screen. As the synchronized filter wheels rotate in the same direction rotate outside of the NVD, the transitions 445 and 447 between the filter wheel channels sweep across the two images in the same rotational direction 449 and 451 from left to right (in the example shown).

With an integrated color NVD, FIGS. 2 and 5A-5B depict the effect when the forward filter wheel 205 is mounted between the rear of the objective lens 204 and the photocathode 208, and rear filter wheel 207 is mounted behind the phosphor screen 214. Because the forward filter wheel 205 is now filtering the inverted image 351 (FIG. 5A) projected by the objective lens 204 onto the photocathode and the rear filter wheel 207 is filtering an erect image 353 (FIG. 5B) displayed on the phosphor screen, the net effect is that the channel transitions 355 and 357 appear to sweep across the two images in opposite directions 359 and 361.

As depicted in FIGS. 2 and 6A-6B, by having the filter wheels of an integrated color NVD which has the forward filter wheel 205 mounted between the rear of the objective lens 204 and the photocathode 208, and rear filter wheel 207 mounted behind the phosphor screen 214 rotate in opposite directions 379, 381, the net effect will be that the channel transitions 375 and 377 will appear to sweep across the two images 371, 381 in the same directions 379, 381, respectively.

Figure 7B:
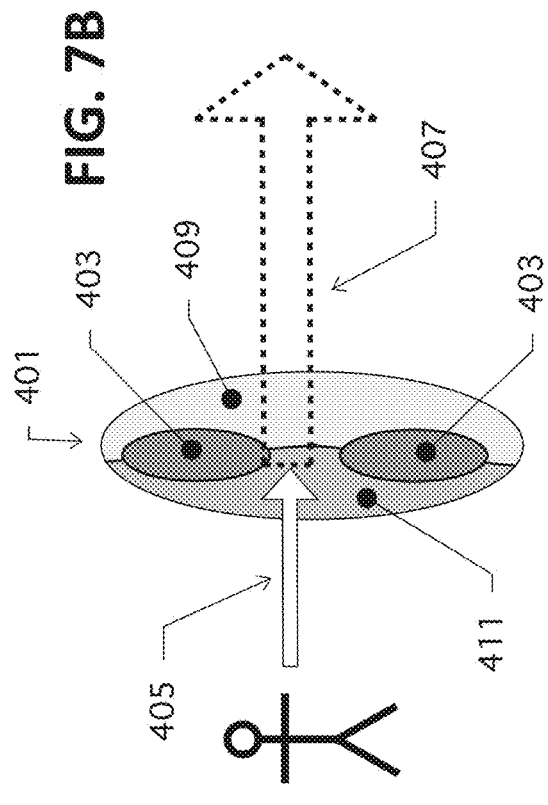
FIG. 7B includes a schematic illustration of an embodiment of filters and black out sections used in an optical device.
Figure 7C:
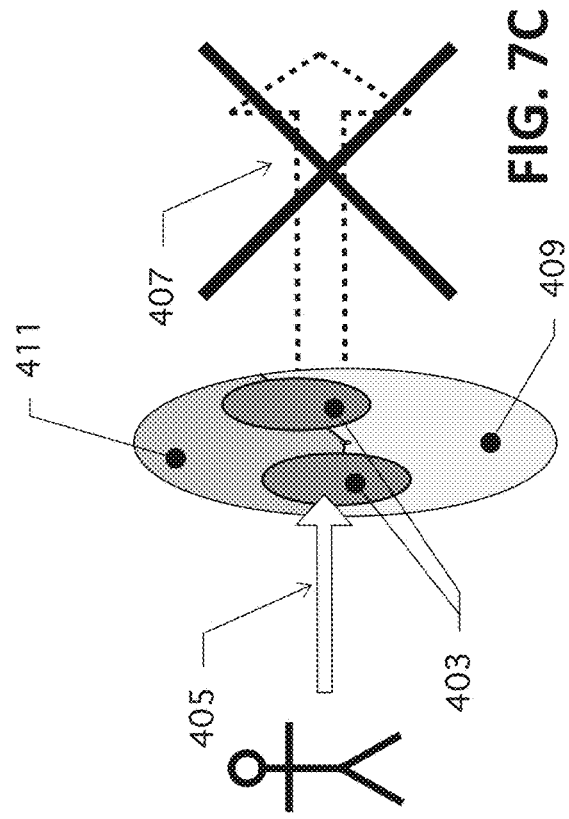
FIG. 7C includes a schematic illustration of an embodiment of filters and black out sections used in an optical device.
Figure 7A:
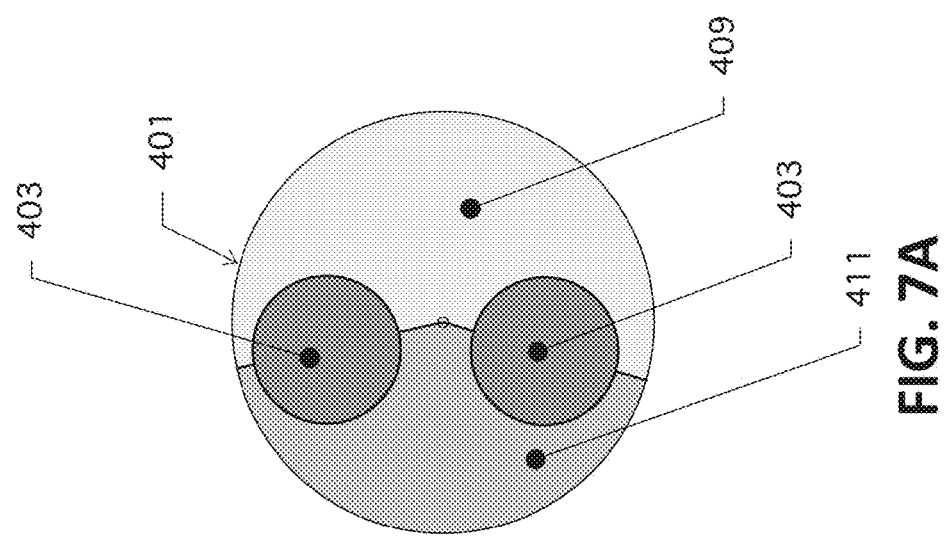
FIG. 7A includes a schematic illustration of an embodiment of filters and black out sections used in an optical device.

In some embodiments, if the color information from the differently filtered channels becomes mixed, the quality of color perception for the user can be degraded. FIGS. 7A-7C illustrate a solution to this problem by configuring the filter wheel 401 with one or more opaque sections 403. The opaque sections 403 can be used to block light 405 from passing into the optical path 407 of the device as rotating channels 409, 411 transition into and out of the optical path 407. Versions of the opaque sections 403 can be sized to completely block and interrupt the optical channel between the channels 409, 411.

Figure 8B:
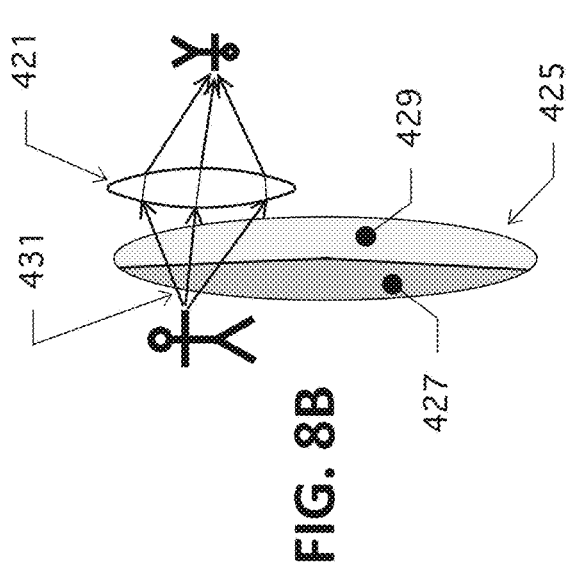
FIG. 8B includes a schematic illustration of another embodiment of filters and black out sections used in an optical device.
Figure 8C:
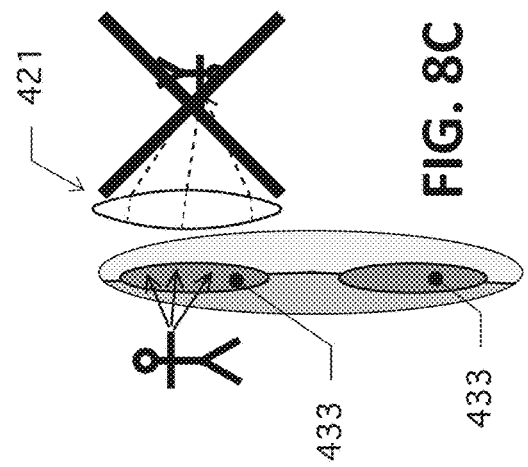
FIG. 8C includes a schematic illustration of another embodiment of filters and black out sections used in an optical device.
Figure 8A:
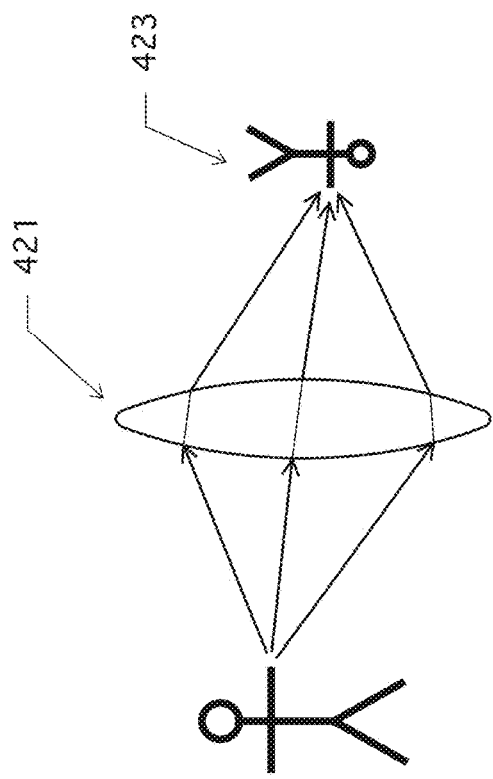
FIG. 8A includes a schematic illustration of another embodiment of filters and black out sections used in an optical device.

As depicted in FIGS. 8A-8C, the entire surface of a lens 421 can contribute to the formation of the focused image 423. Thus, with the combination of an NVD 103 (FIG. 1) and a clip-on color adaptor device 101 where forward filter wheel 425 is mounted in front of the objective lens 421, as the forward filter wheel 425 rotates and transitions between the two channels 427, 429, image forming light will pass through both of the filters channels 427, 429 and the two color information signals will become mixed. Accordingly, large opaque or blackout sections 433 that cover essentially all or all (i.e., an entirety) of the optical path of the device during the channel transitions can prevent channel information from mixing. These larger blackout sections 433 can reduce the total amount of light going through the devices.

In another embodiment of an integrated unit (FIG. 9), the filter wheels 451, 453 can be rotated by two synchronized motors 455, 457, and can be rotated in opposite directions 459. Filter wheel 451 can be located behind the objective lens 461 and in close proximity to the image 463 formed on the photocathode 465. In this way, each point on the image 463 is filtered by only a limited area of the filter wheel 451 lying directly adjacent to it. The photocathode 465 can be coupled to the millions of tunnels or channels 467 in the microchannel plate 469 lying behind it in its optical path. For ease of illustration, FIG. 9 is schematically shown without a housing (e.g., like FIG. 2) for enclosing all of the components, it and other embodiments could be so configured.

Figure 9:
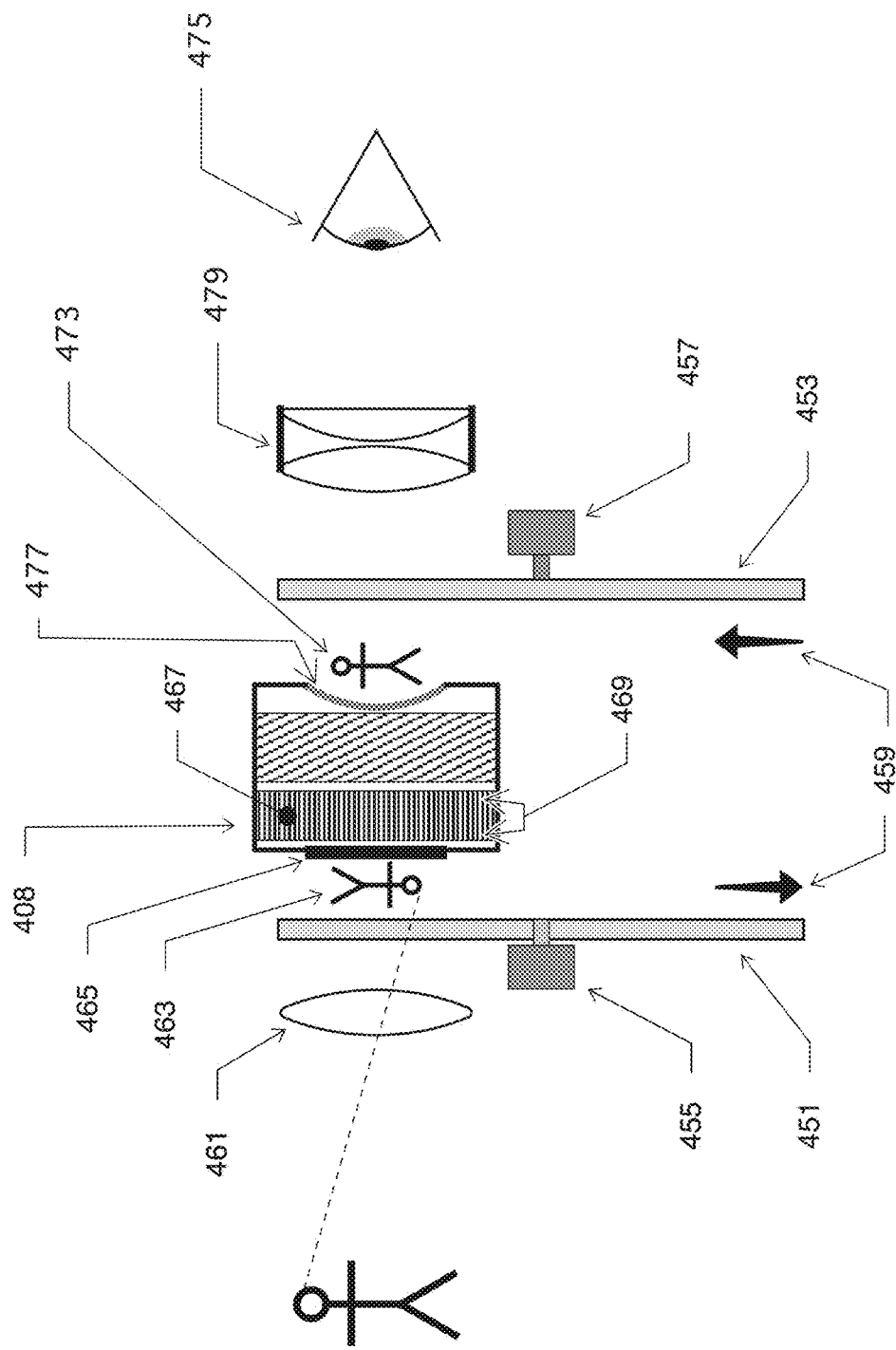
FIG. 9 is a schematic, sectional side view diagram of an embodiment of an integrated optical device.
Figure 10A:
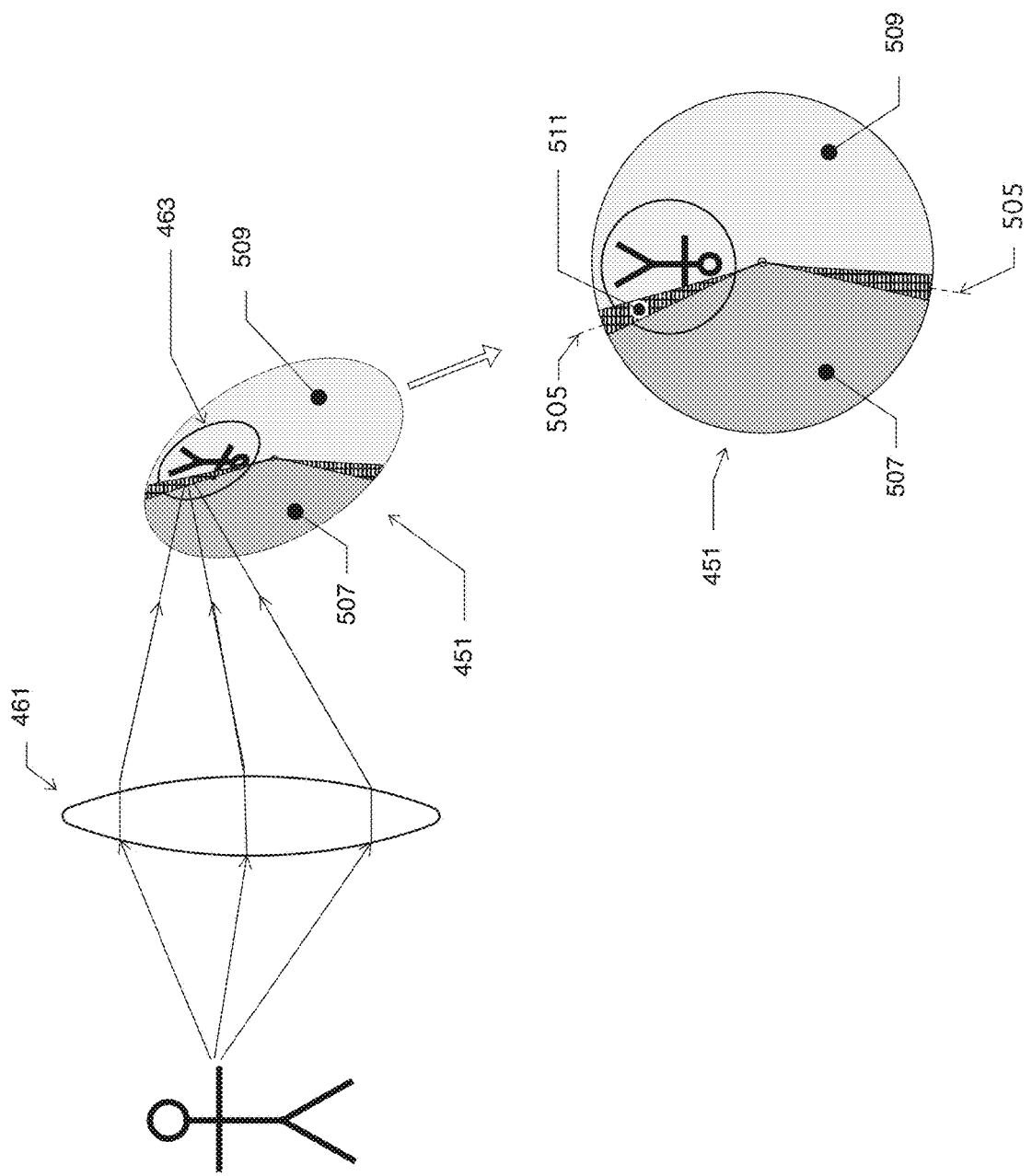
FIG. 10A is a schematic illustration of an embodiment of a filter and black out sections used in an optical device.
Figure 10:
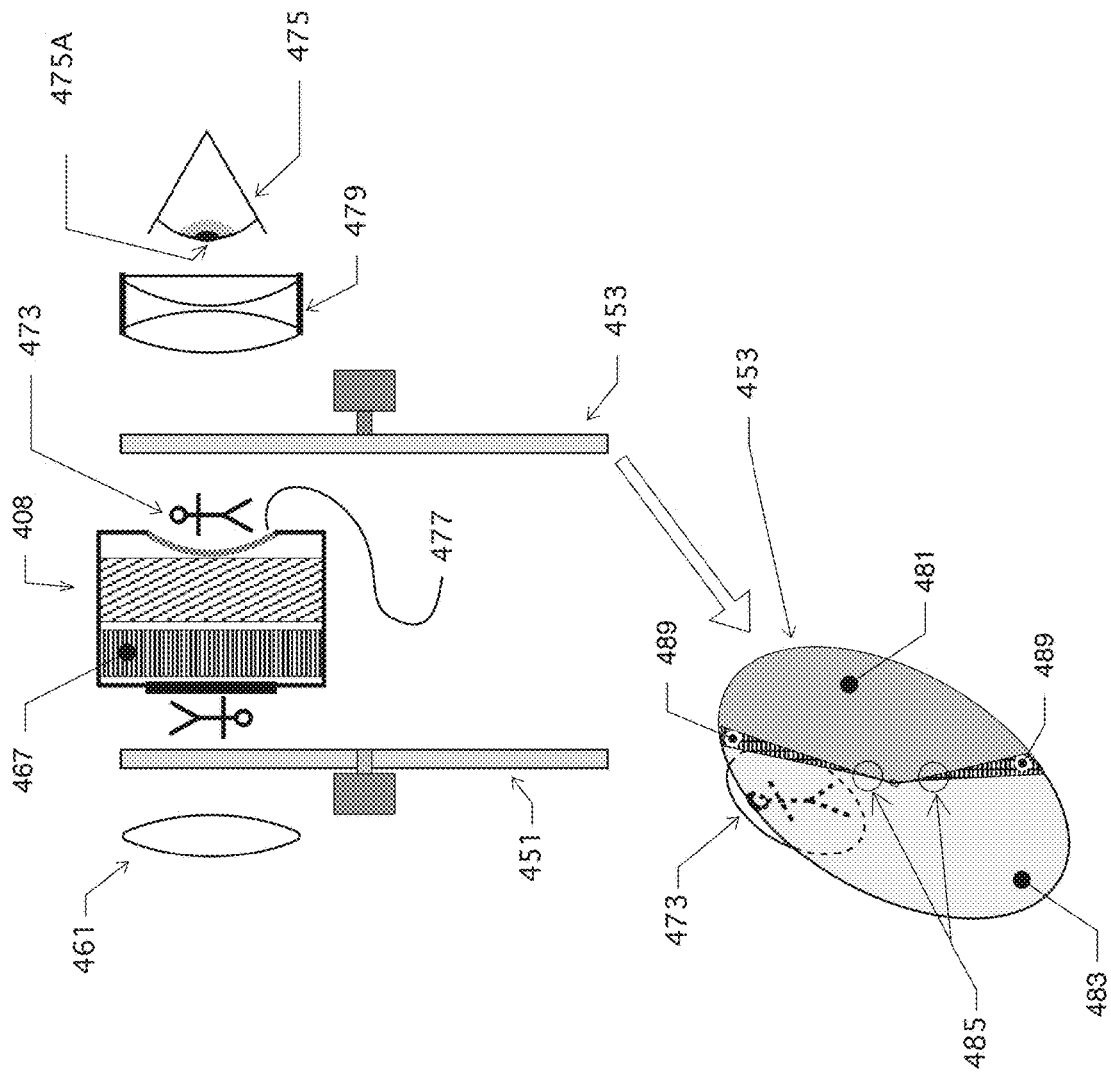
FIG. 10B is a schematic illustration of another embodiment of another integrated optical device and filter wheel.

As depicted in FIGS. 9 and 10A, with a filter wheel 451 can be in close proximity to the image 463 on the photocathode 465. The filter wheel 451 can include one or more transitions 505 between the two filter channels 507, 509. As filter wheel 451 rotates, the transitions 505 can be akin to wiping across a bitmapped image. One or more smaller opaque or blackout sections 511 can be used to prevent mixing of the channel information as the rotating filter wheel 501 transitions from one filter channel 507, 509 to the other. In some versions, the blackout sections 511 can be smaller than the entire optical path of the device, such that less than the entire optical path is blocked when the blackout section 511 is in it. For example, the blackout section 511 can be greater in area than a line of intersection between channels 507, 509. The blackout section 511 can comprise a narrow rectangle or wedge shape that extends in a radial direction to the rotational axis of the filter wheels 507, 509. Examples of the blackout sections 511 can be only narrow enough only to cover fuzzy "mixing shadow" of the channel transition 505 to prevent channel mixing. This design can reduce the system light loss caused by the blackout sections 511 on the forward filter wheel 451.

FIGS. 9 and 10B also illustrate how at the eyepiece 479 of the device, the image 473 the user 475 sees on the phosphor screen 477 of the image intensifier 408 can be formed by what can be referred to as the large number of "pixels" created by the electrons traveling through channels 467 in the microchannel plate 469 and hitting the back of the phosphor screen 477. The eyepiece 479 is, in effect, a magnifier or loupe that adjusts the optics of the eye of the user 475 so that they can focus on the phosphor screen 477. The pupil 475A (FIG. 10B) of the eye of the user 475 is small, so the blurring and thus mixing of the two filter channels 481, 483 is quite small as the boundaries 485 between the two filter channels 481, 483 travels across the image 473. Thus, on the rear filter wheel 453, the blackout sections 489 can be narrow bands that do not completely obstruct the entire optical path, as described herein. Since the blackout sections 511 on the front filter wheel 451 and blackout sections 489 on the rear filter wheel 453 can be narrow and occlude only small areas, the resulting image 473 seen by the user 475 through the device can be brighter.

2. Hybrid System

Embodiments of "hybrid" devices or systems (FIGS. 11A-11D) also are disclosed. Versions of a hybrid system 601 (FIG. 11A) can include an objective lens 603, at least one filter wheel 605, an image intensifier 607 with a photocathode 609 and a phosphor screen 611, a sensor such as a camera 613 to capture the output of the image intensifier 607, an image processor 615 and a red-green-blue (RGB) display 617. In some examples, the camera 613 can be a panchromatic monochrome camera. "Panchromatic" cameras are able to use the all of the light energy of the phosphor screen 611, but the system could employ a non-panchromatic, monochrome camera.

The filter wheel 605 can have two or more channels, as described elsewhere herein. The filter wheel 605 can be driven by a motor 619 having an encoder coupled to the image processor 615. In some versions, the encoder can identify the rotational position of the filter wheel 605 for the image processor 615. One example of an encoder is the model MH10, manufactured by Citizen Micro Co, Ltd., of Saitama, Japan. The hybrid system 601 can have a scene 621 in a field of view and produce an output image on the RGB display 617.

In some versions, the hybrid system 601 can have the filter wheel 605 rotating in front of the objective lens 603. Alternatively, the hybrid device can have a filter wheel 623 (see dashed lines; which can be an alternative or in addition to filter wheel 605) behind the objective lens 603 and in front of the photocathode 609 of the image intensifier 607. The motor 619 can include the encoder or other means of relaying information on the rotational position of the rotating filter wheel 605 to the image processor 615. The output of the phosphor screen 611 of the image intensifier 607 can be captured by the camera 613 and passed to the image processor 615, which can drive the RGB display 617.

Embodiments of the filter wheels 605, 623 can include a shortwave pass (SWP) channel that permits light passage therethrough (but only up to a selected wavelength), and an unfiltered or clear channel that passes essentially all wavelengths of light. When the SWP channel is in the optical path of the hybrid system 601, the image on the phosphor screen 611 is captured by the camera 613, and the processor 615 sends that image to output channels such as the green pixels, blue pixels, or to the blue and green pixels of the RGB display 617. When the unfiltered channel is in the optical path, the processor 615 can send that image to another or different output channel, such as the red pixels of the RGB display 617. Instead of an unfiltered channel, embodiments of the filter wheel 605 also can include a longwave pass (LWP) channel that only passes light with a wavelength greater than a selected wavelength. When the LWP channel is in the optical path of the hybrid system 601, the processor 615 can send the image to the red pixels of the RGB display 617. In these examples, a color image can be created from a monochromatic image intensifier 621. The color effect of including IR light in the color image can be mitigated by employing a SWP filter that "leaks" wavelengths that are greater than about 750 to 800 nm, as described elsewhere herein. In bright light (e.g., in full moon or daylight), an IR blocking filter (e.g., blocks wavelengths greater than, for example, about 650 nm) can be included in the optical path.

Alternatively, the processor 615 can perform a linear transformation whereby the input from the SWP channel is apportioned in a selected ratio to the blue and/or green pixels of the display. A linear transformation of the data can be achieved by, for example, multiplying the brightness values of one channel by a correction factor. The correction factor can be derived by capturing a photo with the sensor of a gray scale test panel through each of the filter channels. The correction factor is the number by which one selected channel's brightness values can be multiplied such that the resulting range of values matches the range of values of the other channel's brightness values. A fixed value also can be added to or subtracted from the each of the brightness values of one channel. For example, AdjustedValue=OriginalValue*0.8, or AdjustedValue=OriginalValue*0.8+0.15.

Similarly, the input of the unfiltered or clear channel can be scaled by a selected amount to the red pixels of the display. The selected amount can include scaling the brightness values of one channel to those of each of the other channels.

Figure 11A:
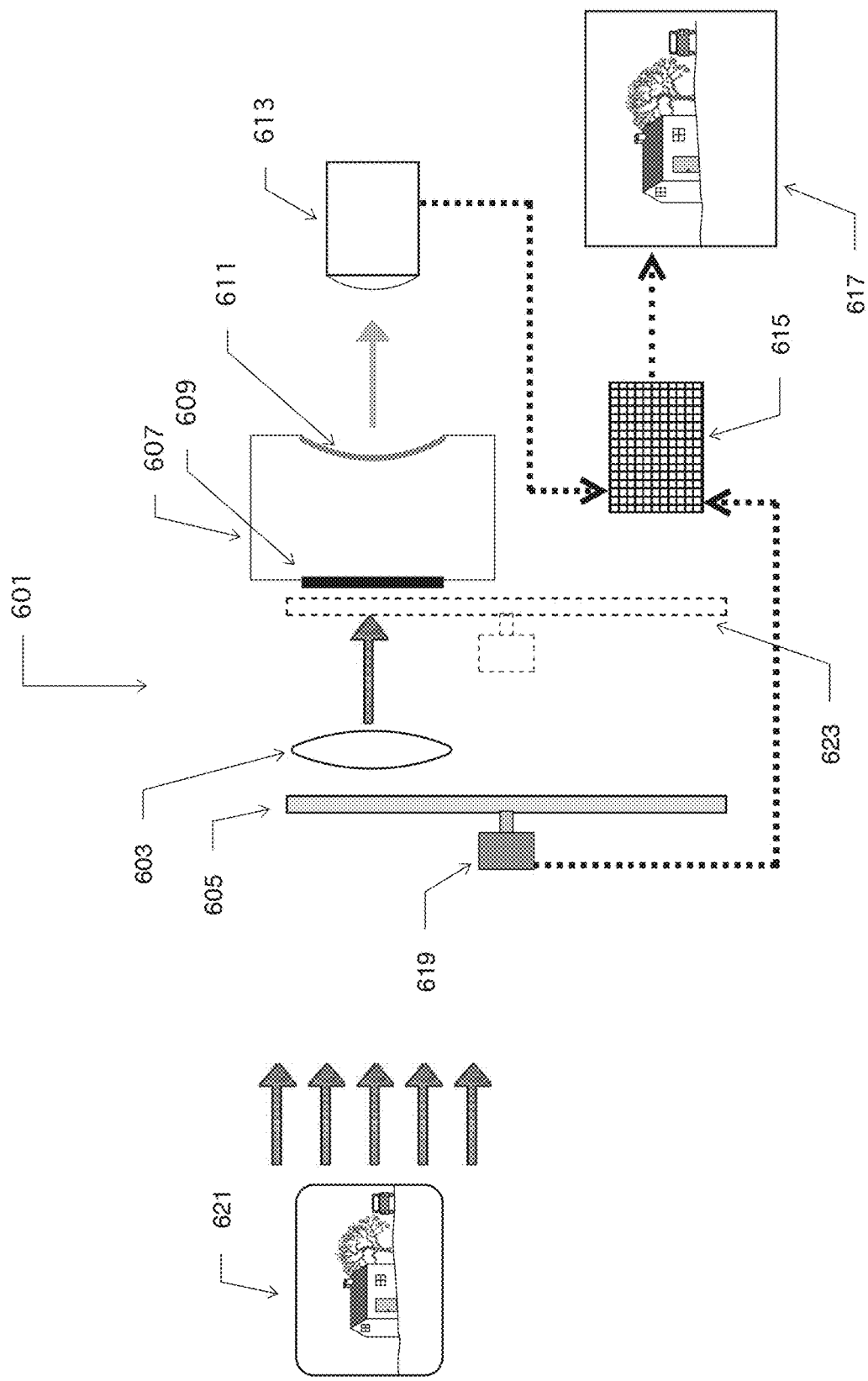
FIG. 11A is a schematic diagram of an alternate embodiment of an optical system.
Figure 11B:
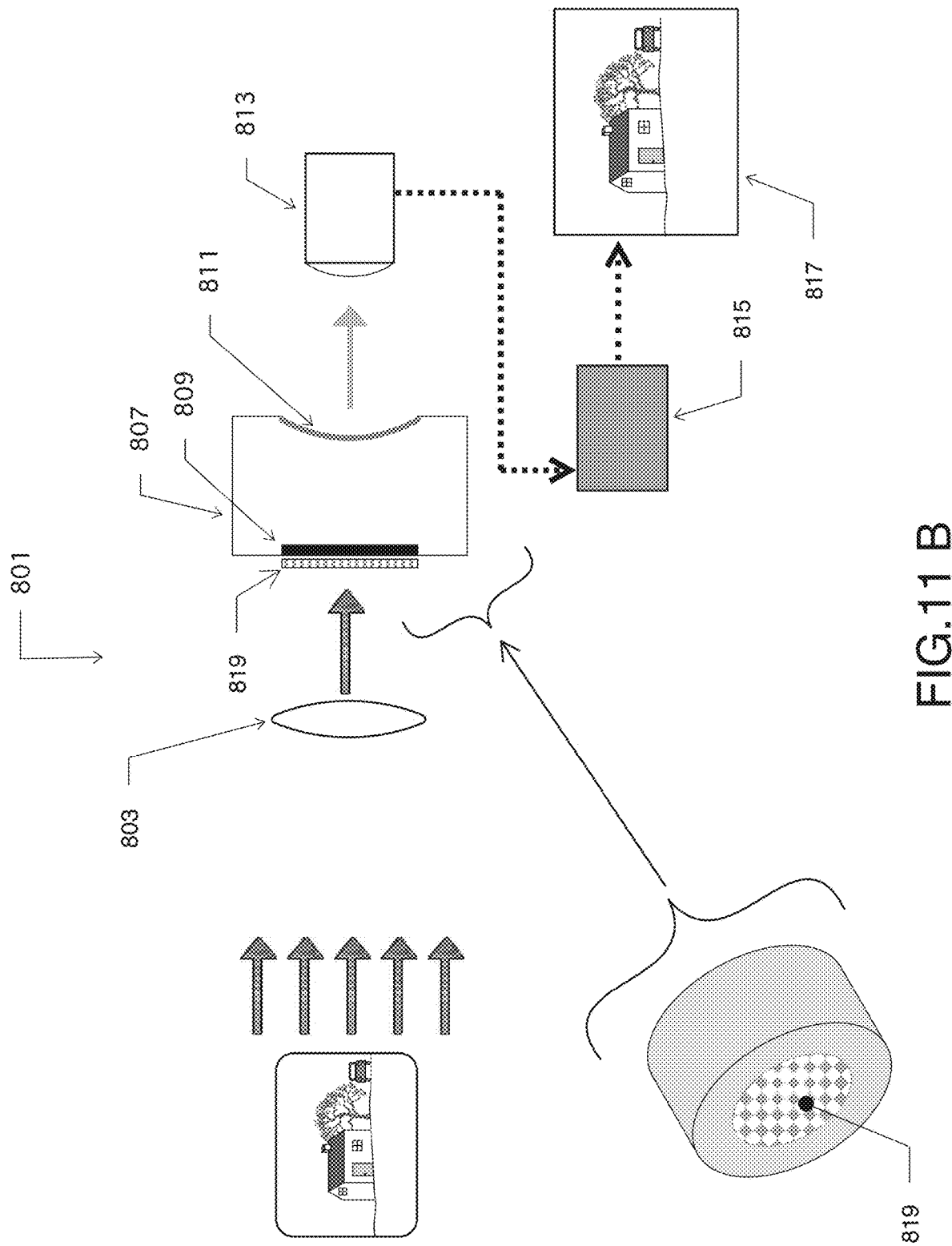
FIG. 11B is a schematic diagram of an alternate embodiment of an optical system.

FIG. 11B depicts an alternate embodiment of a hybrid system 801 for color imaging. The hybrid system 801 also can apply SWP/clear filters to a photocathode. For example, such devices can include an image intensifier 807, an objective lens 803, a sensor such as a camera 813 (e.g., monochromatic camera, a CMOS sensor, CCD sensor or other electronic sensor), an associated processor 815, and an RGB display 817. The image intensifier tube 807 can include a two channel filter array 819 mounted in front of the image intensifier's photocathode 809. The filter array 819 can include a fine pattern of SWP filtered areas and unfiltered (i.e., clear) areas. The sensor or camera 813 can record the image on the phosphor screen 811 of the image intensifier tube 907 and pass it to the processor 815.

In some versions, the identification of the precise locations of the SWP and unfiltered areas of the output of the image intensifier 807 can be calibrated. For example, the calibration can include presenting the device with a blank field or subject that can be illuminated by a wavelength of light that is substantially blocked by the filtered area (e.g., a red light). The subsequent image produced by the image intensifier 807 and captured by the sensor or camera 813 can show a dark and light pattern. The dark areas can correspond to the SWP filtered areas in the image, and the light areas can correspond to the unfiltered areas of the image. This calibration can be stored in the non-volatile memory of the processor 815 as a guide to which areas of the display image that the processor 815 is to render in blue, green or red light, and so direct the correct assignment of colors to the RGB display 817. For example, the SWP filtered areas can be rendered in blue, green, or blue and green pixels of the RGB display 817, and the unfiltered areas can be rendered in red pixels of the RGB display 817.

Figure 12:
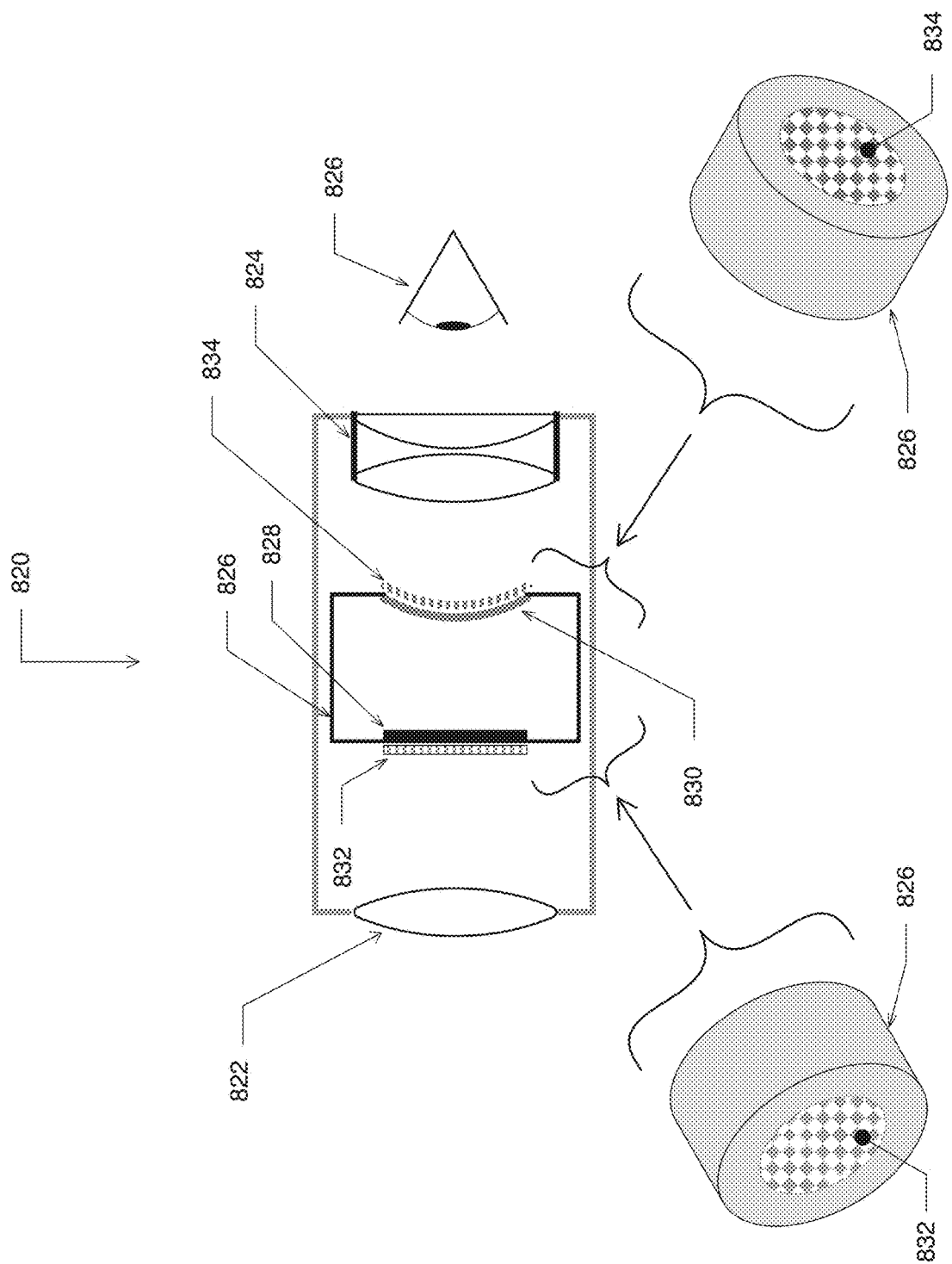
FIG. 12 is a schematic diagram of another embodiment of an optical device.

FIG. 12 depicts another embodiment comprising a stand-alone color image intensifier device (without rotating filters) that is not a hybrid system. Versions can include a two-channel system having a SWP/clear filter applied to a photocathode of an image intensifier, and a LWP/clear filter applied to a phosphor screen thereof. For example, an embodiment of a color night vision system or assembly 820 can include a housing having an objective lens 822, an eyepiece 824, and an image intensifier 826. The image intensifier 826 can include a photocathode 828 and phosphor screen 830.

Embodiments of the image intensifier 826 can be fitted with a two-channel filter array 832 mounted in front of the photocathode 828. The filter array 832 can include a fine pattern of SWP filtered areas and unfiltered areas. The phosphor screen 830 of the image intensifier 826 also can include another two-channel filter array 834. The filter array 834 can include a fine pattern of LWP filtered areas and unfiltered areas. These areas can be proportioned and aligned such that the image areas from the SWP filtered segments of the photocathode 828 correspond to the unfiltered segments of the filter array 834 of the phosphor screen 830. In a like manner, the image areas from the unfiltered segments of the photocathode 828 can correspond to the LWP filtered segments of the filter array 834 of the phosphor screen 830. The phosphors used in this device can be selected to have a broad spectral output including reds, greens, and blues. Accordingly, a color image intensifier tube and, thus, a night vision device can be provided to a user without the need of moving parts such as rotating filter wheels.

In some versions, the two channel filters described herein can be one filtered channel and one unfiltered channel. In other iterations, however, the two channels can both be filtered in front of the photocathode and/or behind (on the eyepiece side) of the phosphor screen. Thus, embodiments can include a color tube by itself, as well as a color night vision device with lenses and an eyepiece.

Figure 11C:
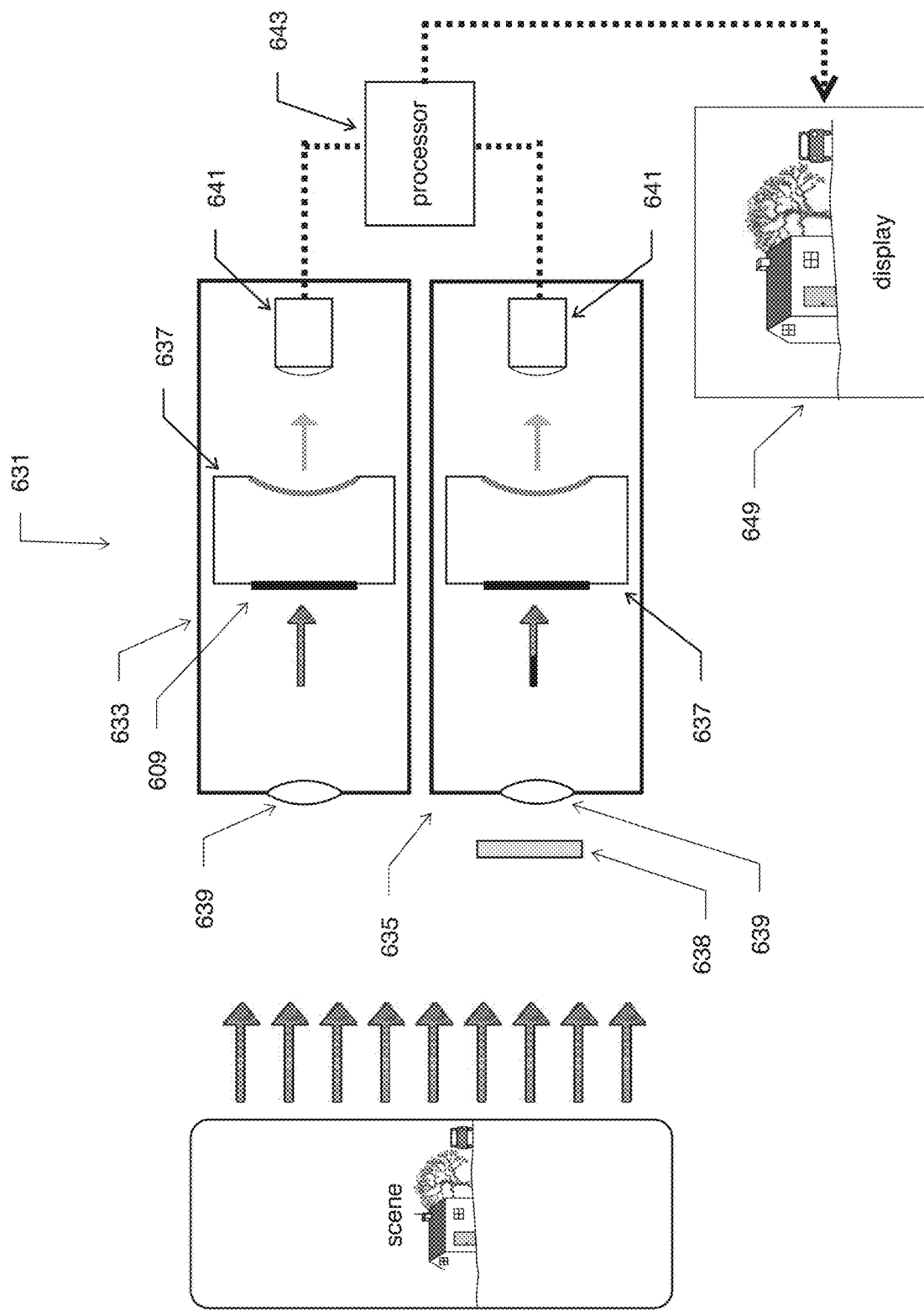
FIG. 11C is a schematic diagram of an alternate embodiment of an optical system.

An alternate embodiment of the hybrid color imaging system shown in FIG. 11C can include assembly 631 having a pair of devices 633, 635 and can use a conventional Generation 3 (Gen 3) or Gen 2 image intensifiers and monochromatic digital sensors. Such devices can include an image intensifier 637, an objective lens 639, a monochromatic camera 641, such as a CMOS sensor, CCD sensor or other electronic sensor, and an associated processor 643. One of the devices 633 can include no filter, and the other device 635 can have a SWP filter 638 in the optical path. The output of the unfiltered device is sent to a processor 643 where it is processed and sent on to drive the red pixels of a RGB display 649. The output of the device 635 with the SWP filter is sent to processor 643 where it is processed and sent on to drive the green, blue, or green and blue pixels of the RGB display 649. The processor 643 can be the only processor of the system, such that the system consists of only the one processor 643. In other versions of this hybrid device, one of the devices has a LWP filter and the other of the devices has no filtration. Alternatively, the hybrid device can have one device with a LWP filter and another device with a SWP filter. Such information can be used in forming the linear scaling transformation of the processor of the hybrid system.

Figure 11D:
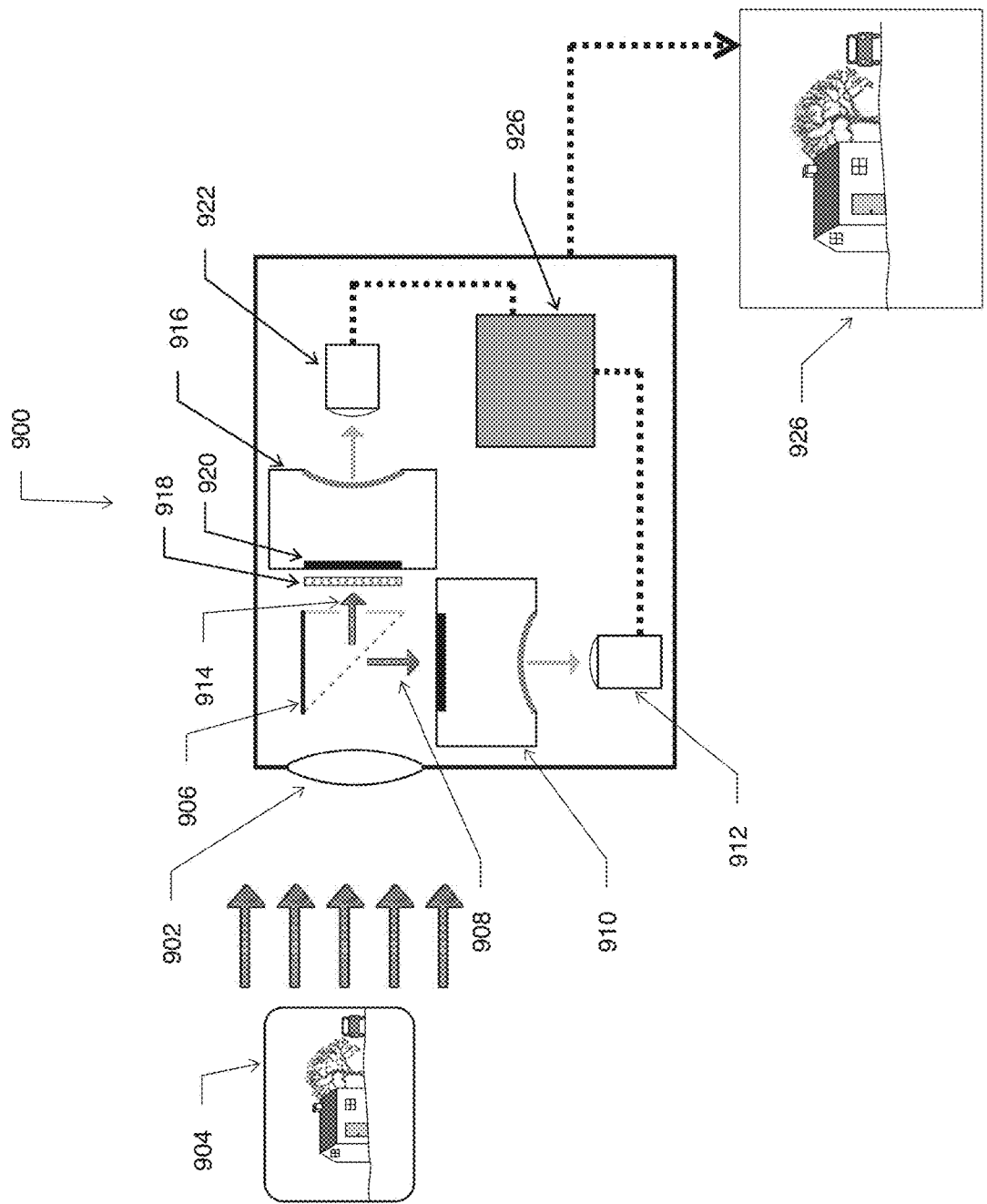
FIG. 11D is a schematic diagram of an alternate embodiment of an optical system.

FIG. 11D depicts an alternate embodiment of a color night vision system having a beam splitter 906 in a hybrid device 900. The beam splitter 906 can enable the use of only one objective lens 902. In this embodiment, device 900 can use the objective lens 902 to send an image of the scene 904 to the beam splitter 906. A portion of the image light 908 can be passed unfiltered to a first image intensifier 910. The output of the first image intensifier 910 can be recorded by sensor 912, such as those described herein. A second portion of the image light 914 can be passed to a second image intensifier 916. This second portion of the image light 914 can pass through a SWP filter 918 before it contacts the second image intensifier's photocathode 920. The output of this second image intensifier 916 can be recorded by a second sensor 922. The output of the two sensors 912, 922 can be passed to a processor 926 where a color image is generated and passed to the display 926.

In some versions, the two-channel filters described herein can include one filtered channel and one unfiltered channel, but in other iterations the two channels can both be filtered with different filters.

A hybrid system using a monochromatic camera to image the phosphor display of an image intensifier tube may not necessarily address the different spectral components of the phosphor. However, the system can address the spectral sensitivity of the image intensifier tube's photocathode. That is because Gen 3 image intensifier tubes have lower sensitivity in the blue/green/yellow than in the red and near-IR. That means that the image captured through a SWP filter would be dimmer than that captured through a LWP filter or no filter (e.g., clear).

This is opposite of the situation where filters are used behind the phosphor screen as with the CVA-14. There, the LWP/red channel is dimmer than the SWP/green channel. The relative brightness of the two channels affects the color balance of the image as seen by the user. Increasing the time spent on the dimmer channel can adjust the perceived color when using a spinning filter. Also, the combined brightness of the blue and green pixels at the display can be used to better balance with the inherently brighter image coming from the clear or LWP filtered channel. The image processor can be configured to adjust a balance between amplitudes of the output applied to the at least one of the blue pixels or the green pixels.

Figure 13:
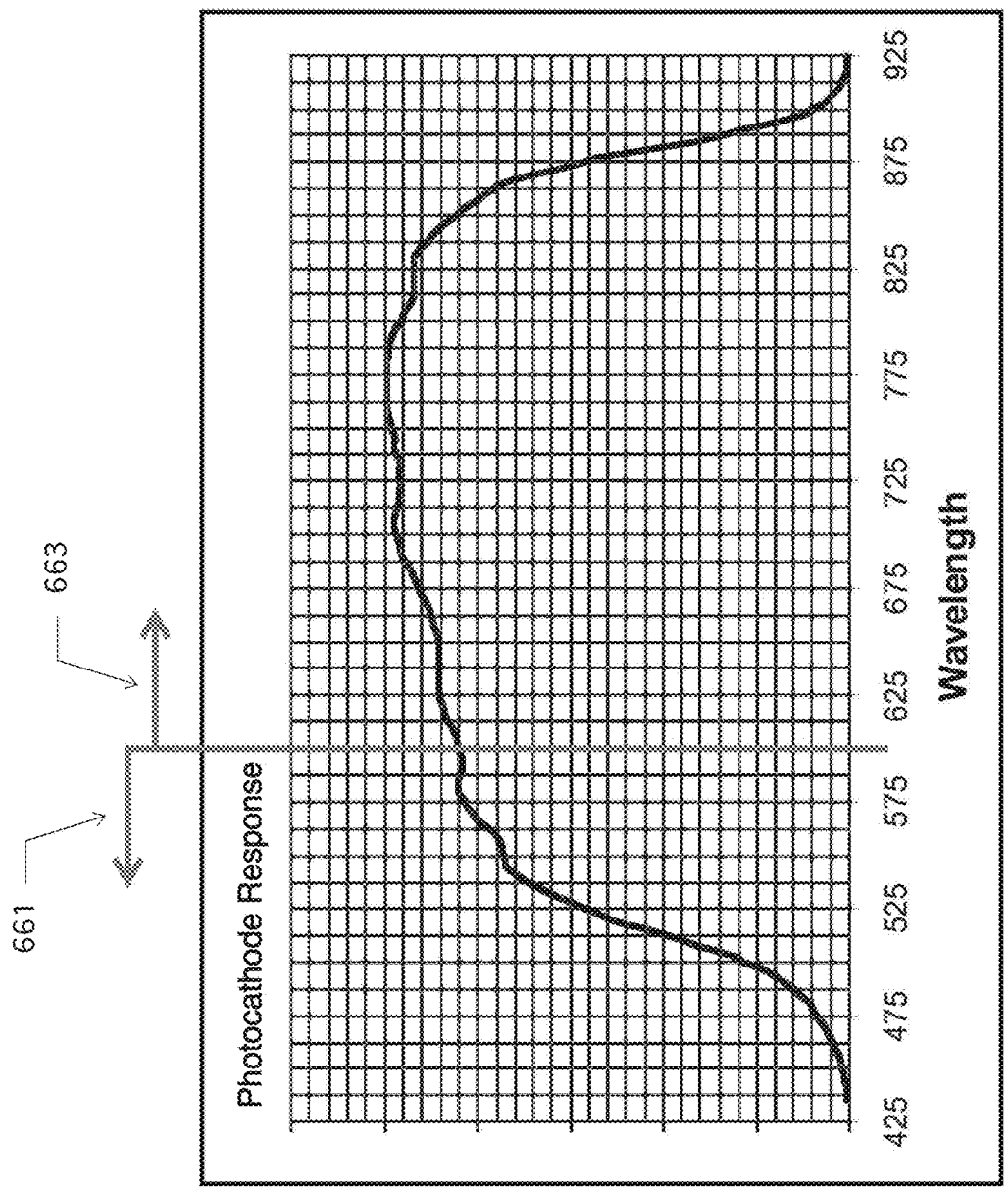
FIG. 13 is a graphic representation of the photocathode response of an image intensifier.

As illustrated in FIG. 13, a Gen 3 image intensifier tube typically has more sensitivity in longer wavelengths of visible and near infrared light than in the shorter wavelength visible light. Therefore, the intensity of the signal when an image intensifier is illuminated with only light passing through a short wave pass filter 661 with a cut-off, for example, at 600 nm, would be lower than the intensity of the signal when an image intensifier is illuminated with only light passing through a long wave pass filter 663 with a cut-on, for example, at 600 nm or when an image intensifier is illuminated with unfiltered light.

With hybrid systems such as the examples described in FIGS. 11A and 11B, the image signal generated by the filter wheel channel that has a SWP filter can be weaker than the image signal generated by the filter wheel channel with a LWP filter or unfiltered channel. To balance the outputs of the two channels, strategies to increase the relative strength of the SWP channel can be employed. For example, the area of the SWP filter segment of the filter wheel can be increased, or the gain on the camera signal can be increased when the SWP filter is in the optical path.

Similarly, with the hybrid systems of FIGS. 11C and 11D, the image signal generated by the camera subsystem that has a SWP filter can be be weaker than the image signal generated by the camera subsystem with a LWP filter or unfiltered channel. To balance the outputs of the two channels, strategies such as increasing the relative strength of the SWP channel by increasing the gain on the camera signal from the SWP channel subsystem can be employed.

Embodiments of the hybrid systems, such as hybrid system 601 in FIG. 11A, can be altered. In some versions, the full output of the phosphor screen 611 (i.e., blue, green, yellow, and red spikes) is captured by the panchromatic monochrome camera 613. As a result, the relative brightness at the phosphor screen when each of the two different filtered channels of the filter wheel 605 is in the optical path of the system can be determined not by the amount of blue, green and yellow output of the P43 phosphor versus the amount of red output of the P43 phosphor, but rather by the effect of the clear channel versus SWP channels of the filter wheel 605. Since the Gen3 image intensifier tubes have most of their sensitivity in the longer visible wavelengths to the near-IR range, the net result is that with embodiments of the hybrid system 601, the image brightness presented on the RGB display 617 can be brighter from the LWP channel than from the SWP channel.

In some versions, the area provided for each channel on the filter wheel 605 can be adjusted to different ratios. Accordingly, color accuracy can be adjusted with other filter channel combinations and different kinds of image intensifier tubes or other detectors. The balance between the areas provided for the two channels on the filter wheel 605 can be selected based on, for example, the composition of the filter channels, the sensitivity of the detector, and the brightness of the different color pixels in the RGB display 617.

Figure 14:
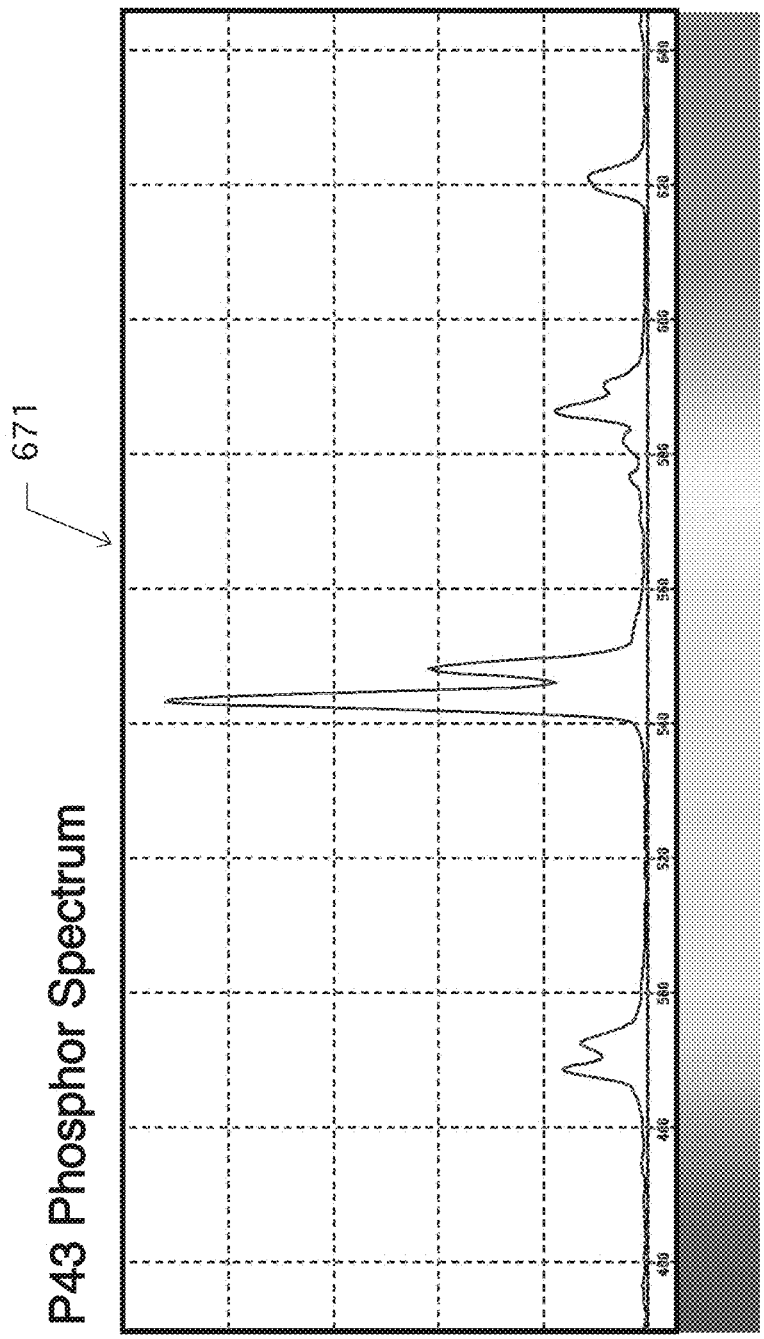
FIG. 14 is a graphic representation of the spectral output of a P43 Green phosphor of an image intensifier.
Figure 15:
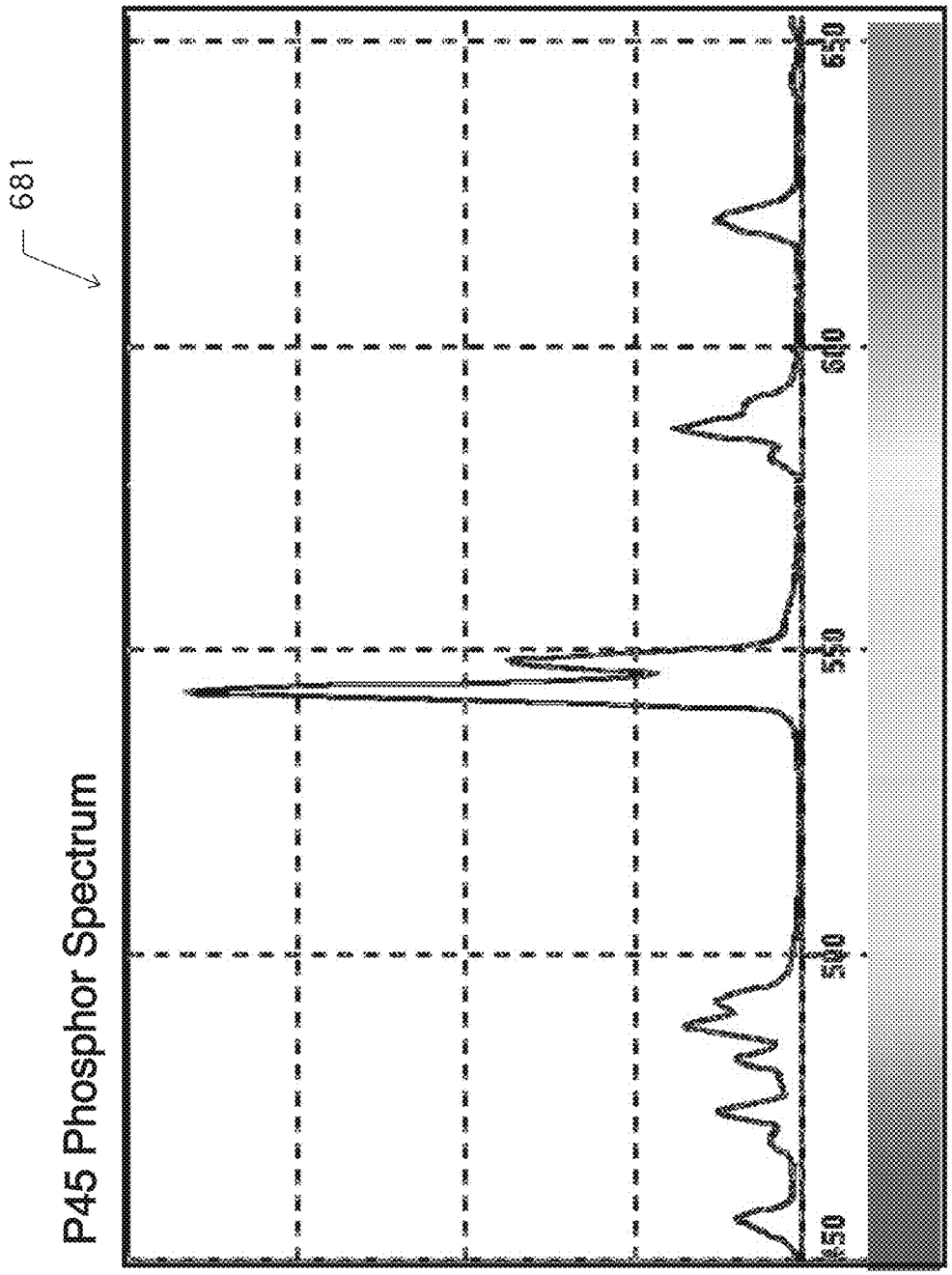
FIG. 15 is a graphic representation of the spectral output of a P45 White phosphor of an image intensifier.

As illustrated in FIGS. 14 and 15 conventional image intensifier devices typically use green P43 or white P45 phosphor, respectively. The output of the P43, 671, and P45, 681 phosphors used in the phosphor display of the image intensifiers is mainly green and other shortwave light, with smaller components of yellow/orange and red light, such as on the order of less than 10% of the total output.

Other embodiments of the hybrid system 601 in FIG. 11A can have a filter wheel 605 with two channels that are both filtered. Alternatively, the hybrid system 601 can have one channel filtered and the other channel clear. The output of the clear channel can drive the blue and/or green pixels in the RGB display 617, and the output of the LWP or Clear channel can drive the red pixels of the RGB display 617. In some versions, the color accuracy of the system can be selected based on, for example, the pixels, sensitivity of the detector and characteristics of the channels.

Some versions of the hybrid systems 601 and 631 (FIGS. 11A and 11C) can include electronic filters instead of or in addition to physical dye or rejection filters. The system also can include a SWP/LWP channels, or clear/SWP channels, or clear/LWP channels.

Alternatives to the image intensifier 621, such as other types of detectors and sensors (e.g., CMOS, back-illuminated CMOS, CCD, SWIR, thermal, etc.) can be employed. In addition, embodiments of producing a color image can be used with detectors and sensors that operate in part or in whole outside of the visible light spectrum, as color representation of the multi-spectral images can aid in better discriminating objects and terrain in the environment. In one example, the system can map information from the image intensifier's visible plus near-IR sensitivity to the visible color range of the human user.

Examples of the filters used to define each channel can incorporate band-blocking or band-passing characteristics that are used to separate selected wavelength information that can be tailored for different applications. For example, some filters can provide clarity and separation of the appearance of certain tissues or fluid in urgent medical care situations. In addition, the processors 615, 643 also can manage the intake and overlay of other data streams into the color night vision image, such as the graphical, mapping, other sensor data, etc.

3. Both Filter Wheels have Clear Channels

Still other embodiments of the device can include a system of filter wheels, which can rotate in front and behind a monochromatic device or image intensifier tube as disclosed herein. The filter wheel can comprise channels or segments that include a SWP channel and a clear channel (i.e., unfiltered). The filter wheel can include a clear channel and a LWP channel. The front and rear filter wheels can be synchronized such that when the SWP channel of the front filter wheel is in front of the objective lens, the clear channel of the rear filter wheel is behind the eyepiece or display output of the device. In addition, when the clear channel of the front filter wheel 105 is in front of the objective lens, the LWP channel of the rear filter wheel can be behind the eyepiece lens or display output of the device.

Accordingly, embodiments of filter wheel can have two channels, but the front and rear filter wheel can differ from each other. For example, the front filter wheel can have a first channel that can comprise a SWP channel, and a second clear or unfiltered channel that passes substantially all of the light entering the system to the objective lens, image intensifier or sensor. In some versions, the rear filter wheel can have a first channel that is clear or unfiltered, and a second channel that is a LWP channel.

The sensitivity of image intensifier tube or CMOS sensor, for example, can be weighted predominantly towards the red and near-infrared (IR) range. At the objective lens end of the device, the SWP filter (as the only filtered channel) can help separate the weaker shortwave signals from the predominantly longer wave sensitivity of the device. The P43 phosphor output of the device predominantly can be in the blue to green range. Thus, having the LWP filter as the only filtered channel at the rear of the device can help separate the weaker longwave signals for the user from the predominantly shortwave output of the device.

The human visual system can process visual stimuli by comparing the information of the filtered channel with the information of the clear channel in a manner that allows the device to produce a color image for the user. This is true despite one of the filtered channels being replaced by a clear, full transmission channel. The elimination of one of the filtered channels and its replacement with a clear channel can significantly increase the light transmission of the device.

In one embodiment, the SWP filter of the front filter wheel can have a cut-off point at between about 550 nm and about 640 nm. When the device includes a green or white phosphor image intensifier, the LWP channel of the rear filter wheel can have a cut-on point that is greater than about 592 nm, so that only the red peaks of the phosphor are permitted to pass. In that version, the yellow or shorter wavelength peaks are not permitted to pass.

In some examples, the relative time proportions between the two channels can be varied to achieve desired system results. In general, a 50-50 to 60-40 proportion between the channels can produce results that substantially balance color performance and system brightness.

4. Stopping Filter Wheel Rotation with Both Clear Channels in the Optical Path

As described herein, the optical viewing system can provide full performance from a NVD when light levels are below the level where the color technology can provide an adequate image by stopping the two filter wheels so that the clear channels of both wheels are in the optical path. Other versions include a method of achieving the same result with the motors and firmware. For example, the method can include halting the rotation of two motors and seeking to lock onto specific hall sensor positions. In another version, one motor has a spring-loaded hub coupled to the filter furthest from the motor, and that filter reverse rotates 180° when the shaft of rotation is not driven so that the two clear segments of the filters align.

A color NVD also can be switched between color and a full-performance, monochrome mode. For example, when a color adaptor device is mounted to a monochrome NVD, the filters reduce the amount of light entering the system. In very low light situations this can degrade system output. In the same environment, however, even degraded color perception can aid in the performance of certain critical tasks, such as orientation, understanding terrain and suspect identification. In extremely low light situations, mounting and unmounting the colorizing device every time it would be helpful to know the color of an object is problematic. This is because the process of unmounting the color conversion device can be time consuming or difficult to perform in darkness.

These problems can be overcome with selected filter wheels that can be switched between a synchronized rotation mode, and a mode where the clear channels of both filter wheels are fixed in a non-rotating position in the optical path. Thus, with the clear sections fixed in the optical path, the full performance of the NVD or other electro-optical device can be achieved, other than small losses due to air/glass surface losses. Switching between these two states can be achieved much more quickly than by mounting and dismounting the color producing system relative to the NVD.

5. Color-Coded Covert Signaling Device

In military operations such as a helicopter exfiltration of troops from enemy territory, it is often important to have a way of coding visual signals. During the daytime, the standard procedure is for troops at the landing area to "pop smoke" (i.e., set off a smoke grenade with a specific color). Smoke of a different color can mean that the landing area has been discovered and the enemy is trying to lure the pilot into an ambush. At night, the standard procedure is to use an IR beacon with a coded flashing pattern, such as those known in the art.

With colorizing devices such as those disclosed herein, an IR beacon can be produced by using IR LEDs of, for example, two selected wavelengths that appear white and red when seen through the colorizing device. In this way a user can provide an encoded IR beacon the color code of which can be seen only by someone with the colorizing device. In other words, a foe without a night vision device cannot perceive the signal, and a foe with a standard night vision device cannot perceive the color pattern of the beacon without a color adaptor or integrated color night vision device in accordance with this disclosure.

6. Manual Autofocus

A common request from medical practitioners or medics in the field that use NVD is to have an autofocus system so that they do not have to reach up and rotate the NVD to re-focus when they are switching between looking at nearby subjects and looking at more distant subjects. One problem with current practice is that it requires touching a soiled or bloody hand to the NVD to adjust focus.

Conventional auto-focus systems are complex electromechanical devices that rely on a sensing system to determine the distance from the optic to the subject plane, and a motor or actuator that adjusts the distance of the lens from the image plane of the optics. Such sensors typically determine focus as by contrast optimization, sonar, or other means. The distance information is then used to determine how the actuator focuses the objective lens. These requirements can result in a system that is fragile, heavy, noisy, and/or power hungry. These characteristics that are not user-friendly when added to the NVD used by the medic.

In general, the tasks of a medic can involve only two main focus zones: up close to deal with a wound or injury, and middle-close to access equipment and medical supplies. A simple positive lens (e.g., akin to reading glasses) can help accommodate these two distances.

To address these concerns a simple, non-electromechanical linkage can move an adaptor lens away from the front of the objective lens, when the head of the medic is raised up, and again position the adaptor lens in front of the objective lens when the head of the medic is lowered. To make this mechanical focus adjusting system even more compact, the single positive lens can be divided to open like a double door, rather than sliding or rotating out of the way. The average working distance for medics can be determined, what they want to look at, as well as when they want to refocus from a nearby subject. The focusing mechanism can be locked out of position for activities other than treating a patient.

Furthermore, the system can use gravity to activate a reading glass-type lens that moves into place when the head of the medic is tilted down. With the focus unit attached to the front of a NVD, a simple electronic circuit and actuator can be used to move the reading glass-type lens in and out of the optical path of the NVD based on the tilt of the head of the operator. The tilt can be determined with small position sensors such as those used in smartphones.

Alternatively, instead of a fixed power positive lens, a liquid-focusing lens could be use. Such a device can give the medic the ability to adjust the near and far-focus to their individual need. Again, the amount of adjustment can be determined by the degree of head tilt.

Another alternative is to configure a liquid lens to use input from the position sensor to provide a continuous range of focus. The values of the input can be determined by the amount the user head tilt. This system can provide a close-focus when looking down (such as at a patient), a mid-focus when the head of the user tilts up to center the NVD image area at an object slightly further away, and a far-focus when the user is looking essentially in a horizontal direction.

7. Collapsible Design

Embodiments of a folding unit also are disclosed. Such designs can be more desirable than a bulkier, non-folding unit. The embodiments disclosed herein can convert a monochromatic NVD (e.g., the PVS-14, known to those of ordinary skill in the art) to color. For example, the two filter wheels 1005 (FIG. 16) spinning at the front and at the rear of the device or image intensifier can be accurately synchronized. Mounting the two filter wheels to a single shaft 1119 (outside of the NVD 1001) that is rotated by a motor is one way to do this. That design, however, may not be able to collapse for stowage. It can be bulkier because the connecting shaft can be outside the NVD housing, while the filters cover all of the objective lens and eyepiece of the NVD. The radial dimension can be doubled since the filter wheels are round. This size requirement can be significant since smaller sizes can be preferred by users.

Figure 16:
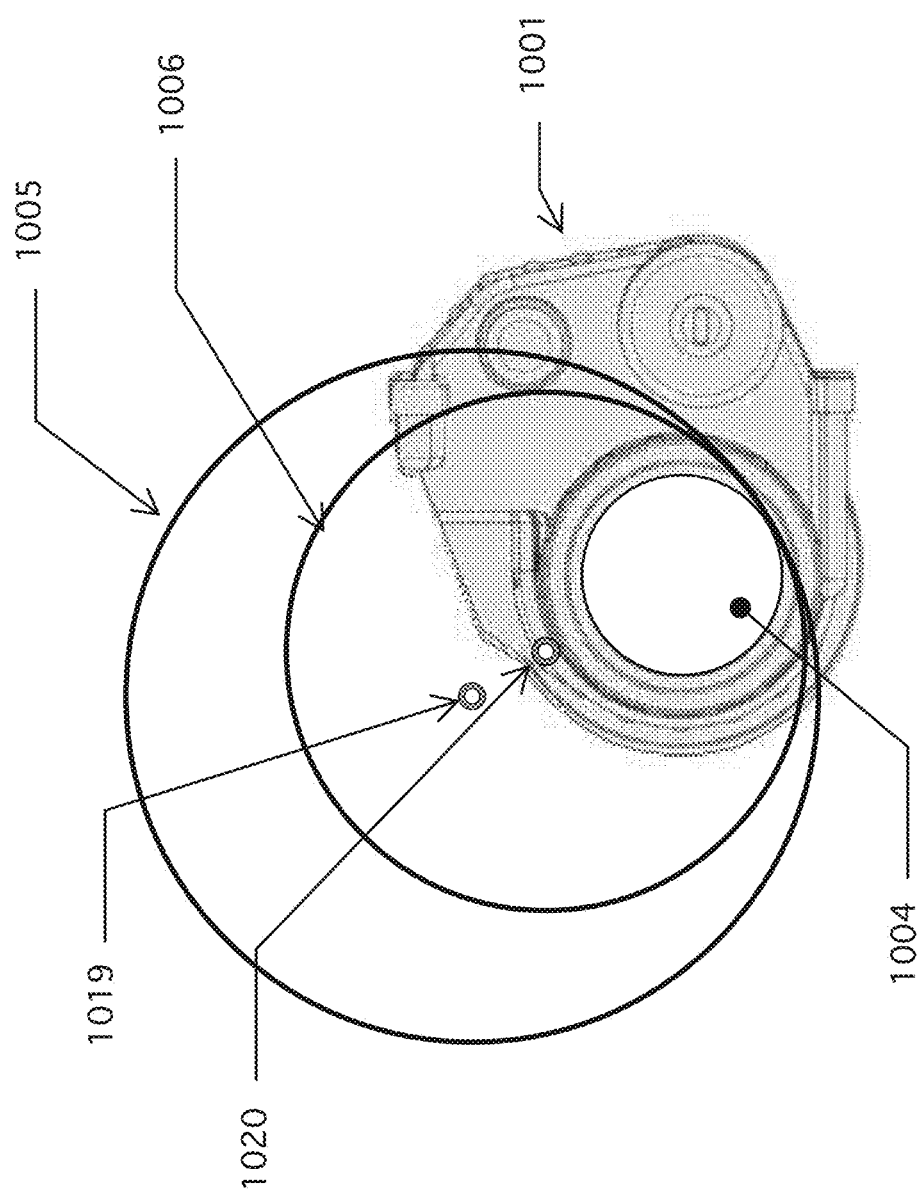
FIG. 16 is a schematic illustration of the relationship of filter size and a night vision device.

Instead of synchronizing the rotating filter wheels with a shaft, two motors can be used. Each motor can have a filter wheel 1006 mounted directly to it. Each motor can be mounted on a shaft 1020 that is substantially closer to a perimeter of a respective one of the lenses 1004. As depicted in the schematic of FIG. 16, since the filter wheel of a folding design only has to reach from one edge of the lens to the opposite side, the diameter of the filter wheel and, hence the overall size of the device, can be substantially reduced. Without the fixed shaft between the two filter wheels, the unit can be folded when not in use, thereby further reducing the storage bulk.

Embodiments of the motors can include two synchronized motors. The synchronicity of the motors can be maintained by monitoring the hall sensors of the motors. For the two motors to be synchronized, the rotational position of each motor is accurately determined. This can be done with an encoder mounted internally or externally relative to a shaft of the motor. Encoders, however, can add weight and bulk. Another solution can employ the Hall sensors of brushless motors, and firmware to detect signals from each Hall sensor to determine the rotational position, among other things. When the device is initiated, an emitter, detector or other sensor can be used to determine the rotational position of a reference point on each filter wheel. This information can be used to adjust the relative position and/or rotational speed of two filters until they are synchronized.

Alternatively, a table of offsets can be determined for each motor and/or filter combination during initial assembly. That information can be stored in the non-volatile memory of the device. The start-up task list can thereby be simplified and decreased. The emitter, detector or other sensor can be used at start-up to determine the gross orientation of the motor to its Hall sensors. This approach can enhance the speed of start-up. In addition, if such a system loses synchronicity due to mechanical vibration or other interruptions, the filters can re-synchronize without having to go through an initial calibration step.

As described herein, embodiments can include enhancements, such as filters having two channel filter wheels with one of the channels on each filter being unfiltered or clear. In some versions, the rotation of the filter wheels is ceased, such that both clear channels are in the optical path to return a monochromatic night vision device to a monochromatic image for enhanced performance in extremely low light conditions. Other embodiments can include a color-coded signaling infrared (IR) device for marking and tagging operations. Examples include color-coded devices themselves and devices such as a system for a helicopter crew chief or other applications.

8. "Leaky" SWP Filter

Use of a conventional, Gen3 image intensifier tube with a NVD system (e.g., ColorTAC™ by Chromatra LLC, of Beverly, Mass.) system can produce relatively accurate color rendition. The Gen3 tubes have extended sensitivity to light with wavelengths up to about 900 nm. Certain materials, such as foliage, and dark blue or black fabrics have a very high emissivity in the near-IR range (>750 nm). For embodiments of the two-channel system described herein (e.g., FIG. 12) using SWP and LWP filters that are separated by about 610 nm, all the near-IR energy can pass through the LWP (or clear) channel. Seen through the red filter at the rear of the NVD, this light can potentially cause foliage and the dark fabrics to have a pronounced red hue.

In some embodiments, a system with a SWP filter not only permits radiation passage that is less than a selected wavelength, but also can "leak" or permit radiation to pass at a higher wavelength. As used herein, the terms "leak" or "leaky" can include embodiments where the SWP filter passes a selected band of incoming radiation spectrum ranging over relatively shorter wavelengths, and at least one additional band of relatively longer wavelengths. For example, the higher wavelength can be at least about 750 nm, or at least about 820 nm. In some versions, when the SWP filter passes wavelengths that are greater than a selected wavelength, the light (rendered in green light from the phosphor) reduces the red hue of objects that have high output or reflectance at greater than the selected wavelength (i.e., the green light desaturates the red hue). This can provide a more pleasing rendition of foliage (more brownish than red), reduce the apparent red hue of the dark fabrics, and also allow IR lasers to be seen as white rather than red.

A "leaky SWP" filter can further enable embodiments of a covert signaling device (described elsewhere herein) using two or more wavelengths of IR light to produce, for example, a flashing red/white image. In the example of an infrared (IR) LED having a wavelength output of at least 820 nm, the color NVD system can pass both red and green lights to the viewer when creating the image of the LED. Accordingly, the image of the IR LED would appear white in color rather than red in color, and would be contrasted to the image of light from an IR LED with a wavelength output <820 nm, which would appear red to the viewer. Thus, in one example, the SWP filter can permit radiation passage in a range such as: 610 nm<SWP<820 nm.

9. Two-Channel Sensor

Figure 17:
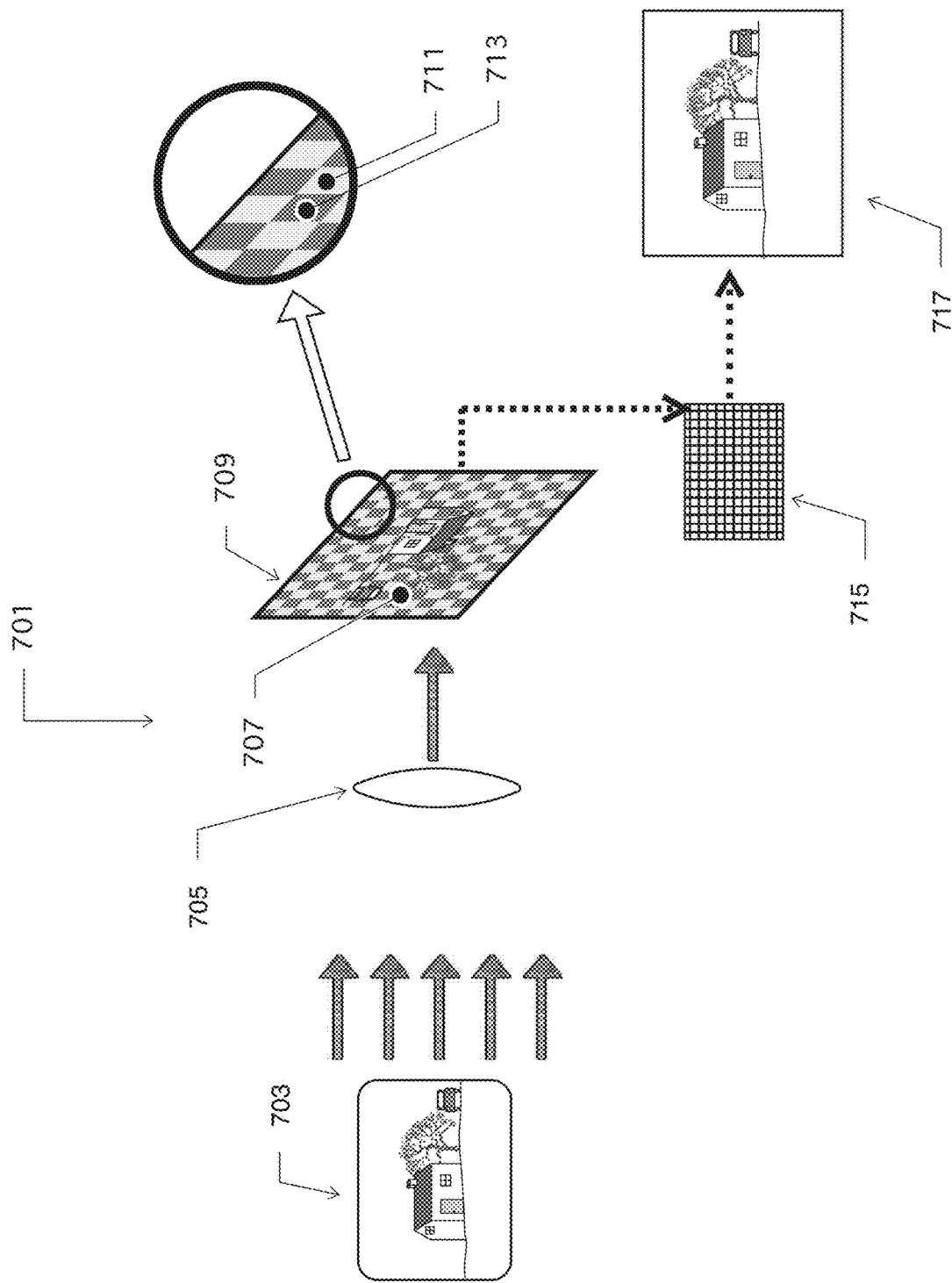
FIG. 17 is a schematic diagram of an alternate embodiment of an optical device.

FIG. 17 is a schematic diagram of an alternate embodiment of an optical device 701. The optical device 701 can view a scene 703 through an objective lens 705. The image 707 of the scene 703 can be focused on versions of a sensor 709. Some versions of sensor 709 can include the sensors described in U.S. Pat. No. 9,177,988, which was incorporated by reference.

Embodiments of the sensor 709 can include a first array 711 of clear, unfiltered pixels. Alternatively, the first array 711 can comprise a LWP filter. Embodiments of the sensor 709 also can include a second array 713 of filtered pixels, such as a SWP filter. As described elsewhere herein for other embodiments, information from the sensor 709 can be processed by a processor 715, and displayed at display 717 (e.g., such as a RGB display). In addition, these embodiments also can include any of the features or elements from the other embodiments described herein. For example, the image processor can be configured to adjust a balance between amplitudes of the output applied to the at least one of the blue pixels or the green pixels.

The color effect of including IR light in the color image can be mitigated by employing a SWP filter that "leaks" wavelengths that are greater than about 750 to 800 nm, as described elsewhere herein. In bright light (e.g., in full moon or daylight), an IR blocking filter (e.g., blocks wavelengths greater than, for example, about 650 nm) can be included in the optical path.

These embodiments can provide satisfactory results by assigning the clear-filter image to drive the red pixels, and the SWP-filtered image to drive the green, blue or green and blue pixels. The computations involved with this approach are much simpler than the computations performed by a RGB color sensor, where a complex process of "nearest neighbor" interpolation of the Bayer pattern RGGB square is used to determine the color of each display pixel.

The color interpolation required of color sensor image processors can be computationally heavy, requiring a relatively significant processor with its associated power consumption. The lighter computational load of the described two-channel approach can be suitable for Sensor-on-Chip (SoC) image sensors for low-power, smaller package cameras for automotive, robot, drone and other applications. This computational savings would be in addition to the advantage of the improved low light performance that the two-channel system can provide. Moreover, sending the two streams of data for off-camera processing also can reduce the bandwidth loads for some remote-sensing color camera applications, or the on-board processing load for a low power sensor.

In some embodiments, the spectrums of wavelengths of electromagnetic radiation can include other selected radiation that can be assigned to the red pixels of the RGB display, and or to the blue, green or blue and green pixels of the RGB display. The spectrums of wavelengths of electromagnetic radiation can include at least one of visible light or nonvisible light comprising at least one of ultraviolet, infrared, SWIR, thermal, gamma, multi-spectral and x-ray radiation. In addition, the radiation sensitive sensors can be an analog imaging sensors or digital imaging sensors.

Other embodiments can include a two-channel color imaging system having a short wave infrared (SWIR) sensor. SWIR can be defined in the wavelength range of 0.7 to 2.5 µm, or alternatively in the wavelength range of 0.9 to 1.7 µm. Examples can include a SWP/LWP filter or one clear filter, and/or a SWP or LWP filter set to filter incoming light to form the color display output. In one version, the SWP filter could pass wavelengths<1200 nm, for example.

Other versions can include one or more of the following embodiments.

An integrated color imaging system, comprising:

a housing having an objective lens configured to receive an image of incident electromagnetic radiation from a scene and focus the image on a photocathode of an image intensifier located inside the housing, the image intensifier having a plurality of radiation sensitive sensors and a phosphor screen;

a first filter wheel located inside the housing between the objective lens and the photocathode, the first filter wheel is configured to be rotatable relative to the image intensifier, the first filter wheel comprises a plurality of first channels selectively positionable in an optical path of the image, and at least one of the first channels is clear and unfiltered;

a second filter wheel located inside the housing between the phosphor screen and an eyepiece lens of the housing, the second filter wheel is configured to be rotatable relative to the image intensifier, the second filter wheel comprises a plurality of second channels selectively positionable in the optical path between the phosphor screen and the eyepiece lens, and at least one of the second channels is clear and unfiltered; and the clear and unfiltered channels of the first and second filter wheels can be configured to be selectively aligned in the optical path and retained in stationary positions.

The system of any of these embodiments, wherein at least one of the first and second channels comprises a short wave pass (SWP) filter.

The system of any of these embodiments, wherein the SWP filter also permits passage of electromagnetic radiation having selected wavelengths that exceed wavelengths of green or blue.

The system of any of these embodiments, wherein the SWP filter also permits passage of electromagnetic radiation having a wavelength of at least about 750 nm.

The system of any of these embodiments, wherein the SWP filter also permits passage of electromagnetic radiation having a wavelength of at least about 820 nm.

The system of any of these embodiments, wherein the first and second filter wheels are mounted to a common shaft and are synchronized.

The system of any of these embodiments, wherein the first and second filter wheels are configured to be rotated by separate motors.

The system of any of these embodiments, wherein the first and second filter wheels are configured to rotate in opposite directions.

The system of any of these embodiments, wherein the first and second filter wheels are mounted to different shafts, driven by separate motors, and are synchronized.

The system of any of these embodiments, wherein each of the first and second filter wheels comprises transitions between respective ones of the first channels and the second channels, and further comprising an opaque section that blocks light at each of the transitions, and each opaque section extends in a radial direction relative to a rotational axis of the filter wheels and is configured to block only a portion of the optical path when located directly in the optical path.

A color imaging system, comprising:
an optical device configured to view a scene through an objective lens to focus the scene on a radiation sensitive sensor, wherein the radiation sensitive sensor is configured to generate, in response to incident electromagnetic radiation from the scene:
a first set of electrical signals indicative of a first channel comprising a first spectrum of wavelengths of electromagnetic radiation, a first array of radiation sensitive pixels that are enabled to detect the first spectrum of wavelengths of electromagnetic radiation, and the first array of radiation sensitive pixels comprise at least one of clear, unfiltered pixels or long wave pass (LWP) filtered pixels;
a second set of electrical signals indicative of a second channel comprising a second spectrum of wavelengths of electromagnetic radiation, and a second array of radiation sensitive pixels that are enabled to detect the second spectrum of wavelengths of electromagnetic radiation, and the second array of radiation sensitive pixels comprise short wave pass (SWP) filtered pixels; and
an image processor coupled to the radiation sensitive sensor and having circuitry configured to:
receive the first set of electrical signals indicative of the first channel and the second set of electrical signals indicative of the second channel;
derive an output based on the first set of electrical signals to at least one of blue pixels or green pixels of a red-green-blue (RGB) display, and a second output based on the second set of electronic signals to red pixels of the RGB display to generate a full-color image of the scene; and
display the full-color image on the RGB display.

The system of any of these embodiments, wherein the SWP filter also permits passage of electromagnetic radiation having selected wavelengths that exceed wavelengths of the green or blue pixels.

The system of any of these embodiments, wherein the SWP filter also permits passage of electromagnetic radiation having a wavelength of at least about 750 nm.

The system of any of these embodiments, wherein the SWP filter also permits passage of electromagnetic radiation having a wavelength of at least about 820 nm.

The system of any of these embodiments, wherein the image processor is configured to adjust a balance between amplitudes of the second output applied to the at least one of the blue pixels or the green pixels is selected or adjusted.

A hybrid color imaging system, comprising:
an optical assembly comprising first and second monochromatic devices, each comprising an optical path, an image intensifier, an objective lens, a monochromatic camera, the first monochromatic device comprises no filter or a long wave pass filter (LWP) in a respective optical path, and the second monochromatic device comprises a short wave pass (SWP) filter in a respective optical path;
an image processor coupled to the first and second monochromatic devices and having circuitry configured to:
receive and process signals from the first monochromatic device to derive an output to drive only red pixels of a red-green-blue (RGB) display; and
receive and process signals from the second monochromatic device to derive an output to drive only at least one of green pixels or blue pixels of the RGB display; and
generate and display a full-color image of the scene on the RGB display.

This written description uses examples to disclose the embodiments, including the best mode, and also to enable those of ordinary skill in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities can be performed in addition to those described. Still further, the order in which activities are listed are not necessarily the order in which they are performed.

In the foregoing specification, the concepts have been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

It can be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, can mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items can be used, and only one item in the list may be needed. For example, "at least one of: A, B, and C" includes any of the following combinations: A, B, C, A and B, A and C, B and C, and A and B and C.

Also, the use of "a" or "an" are employed to describe elements and components described herein. This is done merely for convenience and to give a general sense of the scope of the invention. This description should be read to include one or at least one and the singular also includes the plural unless it is obvious that it is meant otherwise.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, can also be provided in combination in a single embodiment. Conversely, various features that are, for brevity, described in the context of a single embodiment, can also be provided separately or in any subcombination. Further, references to values stated in ranges include each and every value within that range.

What is claimed is:

1. An integrated color imaging system, comprising:
   a housing having an objective lens configured to receive an image of incident electromagnetic radiation from a scene and focus the image on a photocathode of an image intensifier located inside the housing, the image intensifier having a plurality of radiation sensitive sensors and a phosphor screen;
   a first filter wheel located inside the housing between the objective lens and the photocathode, the first filter wheel is configured to be rotatable relative to the image intensifier, the first filter wheel comprises a plurality of first channels selectively positionable in an optical path of the image, and at least one of the first channels is clear and unfiltered;
   a second filter wheel located inside the housing between the phosphor screen and an eyepiece lens of the housing, the second filter wheel is configured to be rotatable relative to the image intensifier, the second filter wheel comprises a plurality of second channels selectively positionable in the optical path between the phosphor screen and the eyepiece lens, and at least one of the second channels is clear and unfiltered; and
   the clear and unfiltered channels of the first and second filter wheels are configured to be selectively aligned in the optical path and retained in stationary positions.

2. The integrated color imaging system of claim 1, wherein at least one of the first and second channels comprises a short wave pass (SWP) filter.

3. The integrated color imaging system of claim 2, wherein the SWP filter also permits passage of electromagnetic radiation having selected wavelengths that exceed wavelengths of green or blue.

4. The integrated color imaging system of claim 2, wherein the SWP filter also permits passage of electromagnetic radiation having a wavelength of at least about 750 nm.

5. The integrated color imaging system of claim 2, wherein the SWP filter also permits passage of electromagnetic radiation having a wavelength of at least about 820 nm.

6. The integrated color imaging system of claim 1, wherein the first and second filter wheels are mounted to a common shaft and are synchronized.

7. The integrated color imaging system of claim 1, wherein the first and second filter wheels are configured to be rotated by separate motors.

8. The integrated color imaging system of claim 7, wherein the first and second filter wheels are configured to rotate in opposite directions.

9. The integrated color imaging system of claim 1, wherein the first and second filter wheels are mounted to different shafts, driven by separate motors, and are synchronized.

10. The integrated color imaging system of claim 1, wherein each of the first and second filter wheels comprises transitions between respective ones of the first channels and the second channels, and further comprising an opaque section that blocks light at each of the transitions, and each opaque section extends in a radial direction relative to a rotational axis of the filter wheels and is configured to block only a portion of the optical path when located directly in the optical path.

* * * * *